United States Patent
Livshin et al.

(10) Patent No.: US 12,099,637 B2
(45) Date of Patent: Sep. 24, 2024

(54) SECURE DEVICE PROGRAMMING SYSTEM WITH HARDWARE SECURITY MODULE AND SECURITY INTEROP LAYER

(71) Applicant: Data I/O Corporation, Redmond, WA (US)

(72) Inventors: Aleksandr Livshin, Bothell, WA (US); Edwin Ralf Musch, Redmond, WA (US)

(73) Assignee: Data I/O Corporation, Redmond, WA (US)

( * ) Notice: Subject to any disclaimer, the term of this patent is extended or adjusted under 35 U.S.C. 154(b) by 159 days.

(21) Appl. No.: 17/860,979

(22) Filed: Jul. 8, 2022

(65) Prior Publication Data
US 2023/0012013 A1    Jan. 12, 2023

Related U.S. Application Data

(60) Provisional application No. 63/219,793, filed on Jul. 8, 2021.

(51) Int. Cl.
| | |
|---|---|
| G06F 21/78 | (2013.01) |
| G06F 21/60 | (2013.01) |
| G06F 21/70 | (2013.01) |
| G06F 21/72 | (2013.01) |
| G06F 21/88 | (2013.01) |

(52) U.S. Cl.
CPC ............ *G06F 21/72* (2013.01); *G06F 21/602* (2013.01); *G06F 21/78* (2013.01)

(58) Field of Classification Search
None
See application file for complete search history.

(56) References Cited

U.S. PATENT DOCUMENTS

| | | | |
|---|---|---|---|
| 10,015,164 B2 * | 7/2018 | Hamburg | H04W 12/0431 |
| 2019/0245696 A1 | 8/2019 | Gulati et al. | |
| 2020/0267142 A1 | 8/2020 | Hamburg et al. | |
| 2020/0274716 A1 | 8/2020 | Bott et al. | |
| 2021/0064588 A1 | 3/2021 | Fender et al. | |
| 2021/0152341 A1 | 5/2021 | Park et al. | |

FOREIGN PATENT DOCUMENTS

CN      106909126 B   *   3/2019   ......... G05B 19/4097

OTHER PUBLICATIONS

Sentrix. Data I/O Inc. (Year: 2021).*
World Intellectual Property Organization, Application No. PCT/US22/36580, International Search Report dated Nov. 10, 2022.

* cited by examiner

*Primary Examiner* — Venkat Perungavoor
(74) *Attorney, Agent, or Firm* — Shield Intellectual Property PC

(57) ABSTRACT

A secure programming system and method for provisioning and programming a target payload into a programmable device mounted in a programmer. The programmable devices are provisioned with a job package created by a user on a host system and deployed on a device programmer. The secure programming system supports a hardware security module on the host system that can be accessed remotely from the device programmer using coordinated sets of template and mechanism dictionaries linked to a security API coupled to the hardware security module.

20 Claims, 16 Drawing Sheets

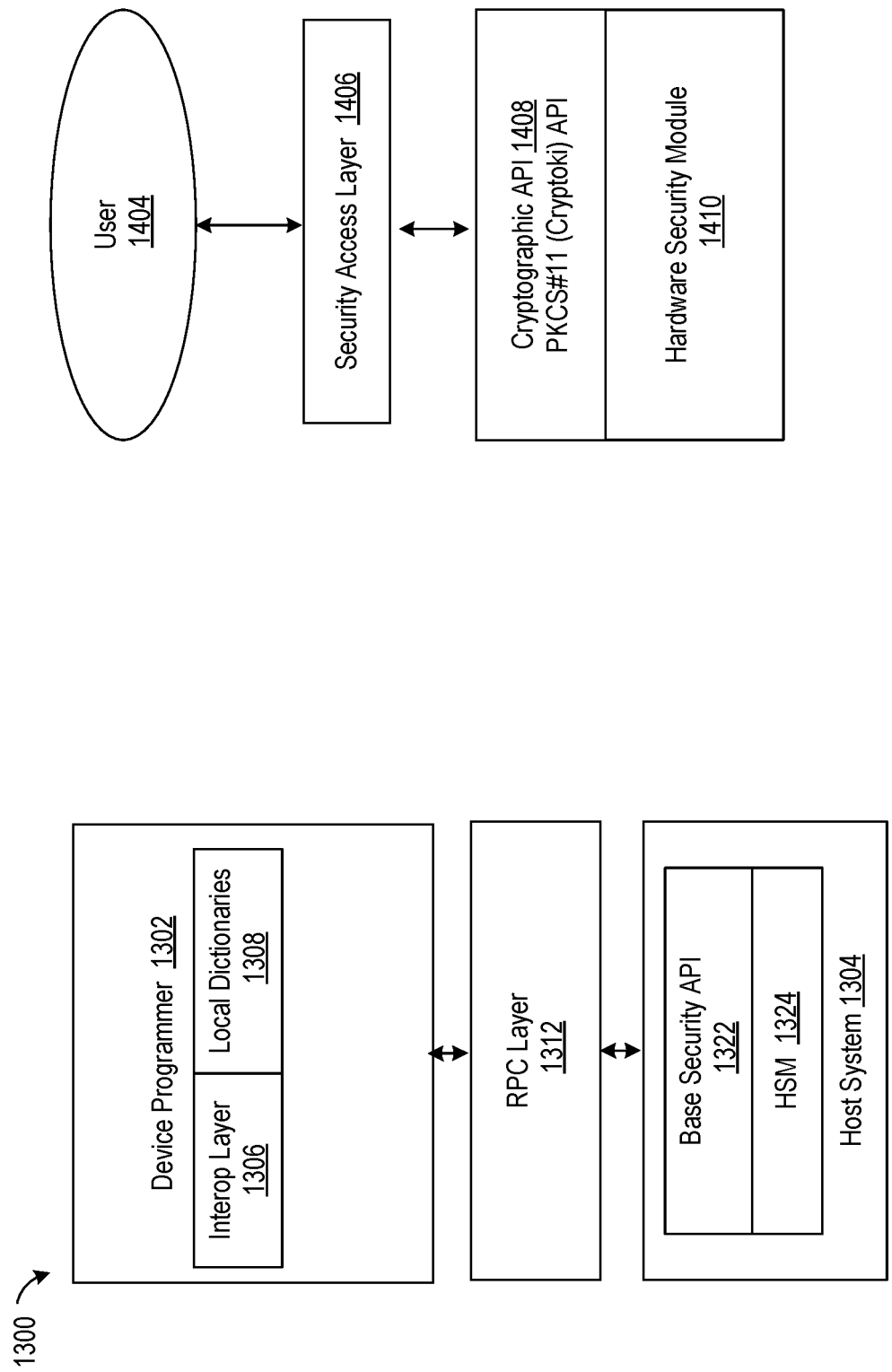

Table 1

| Category | Function | Description |
|---|---|---|
| General purpose functions | C_Initialize | initializes Cryptoki |
| | C_Finalize | clean up miscellaneous Cryptoki-associated resources |
| | C_GetInfo | obtains general information about Cryptoki |
| | C_GetFunctionList | obtains entry points of Cryptoki library functions |
| Slot and token management functions | C_GetSlotList | obtains a list of slots in the system |
| | C_GetSlotInfo | obtains information about a particular slot |
| | C_GetTokenInfo | obtains information about a particular token |
| | C_WaitForSlotEvent | waits for a slot event (token insertion, removal, etc.) to occur |
| | C_GetMechanismList | obtains a list of mechanisms supported by a token |
| | C_GetMechanismInfo | obtains information about a particular mechanism |
| | C_InitToken | initializes a token |
| | C_InitPIN | initializes the normal user's PIN |
| | C_SetPIN | modifies the PIN of the current user |
| Session management functions | C_OpenSession | opens a connection between an application and a particular token or sets up an application callback for token insertion |
| | C_CloseSession | closes a session |
| | C_CloseAllSessions | closes all sessions with a token |
| | C_GetSessionInfo | obtains information about the session |
| | C_GetOperationState | obtains the cryptographic operations state of a session |
| | C_SetOperationState | sets the cryptographic operations state of a session |
| | C_Login | logs into a token |
| | C_Logout | logs out from a token |
| Object management functions | C_CreateObject | creates an object |
| | C_CopyObject | creates a copy of an object |
| | C_DestroyObject | destroys an object |
| | C_GetObjectSize | obtains the size of an object in bytes |
| | C_GetAttributeValue | obtains an attribute value of an object |
| | C_SetAttributeValue | modifies an attribute value of an object |
| | C_FindObjectsInit | initializes an object search operation |
| | C_FindObjects | continues an object search operation |
| | C_FindObjectsFinal | finishes an object search operation |
| Encryption functions | C_EncryptInit | initializes an encryption operation |
| | C_Encrypt | encrypts single-part data |
| | C_EncryptUpdate | continues a multiple-part encryption operation |
| | C_EncryptFinal | finishes a multiple-part encryption operation |

FIG. 18A

Table 1 (cont.)

| | | |
|---|---|---|
| Decryption functions | C_DecryptInit | initializes a decryption operation |
| | C_Decrypt | decrypts single-part encrypted data |
| | C_DecryptUpdate | continues a multiple-part decryption operation |
| | C_DecryptFinal | finishes a multiple-part decryption operation |
| Message digesting functions | C_DigestInit | initializes a message-digesting operation |
| | C_Digest | digests single-part data |
| | C_DigestUpdate | continues a multiple-part digesting operation |
| | C_DigestKey | digests a key |
| | C_DigestFinal | finishes a multiple-part digesting operation |
| Signing and MACing functions | C_SignInit | initializes a signature operation |
| | C_Sign | signs single-part data |
| | C_SignUpdate | continues a multiple-part signature operation |
| | C_SignFinal | finishes a multiple-part signature operation |
| | C_SignRecoverInit | initializes a signature operation, where the data can be recovered from the signature |
| | C_SignRecover | signs single-part data, where the data can be recovered from the signature |
| Functions for verifying signatures and MACs | C_VerifyInit | initializes a verification operation |
| | C_Verify | verifies a signature on single-part data |
| | C_VerifyUpdate | continues a multiple-part verification operation |
| | C_VerifyFinal | finishes a multiple-part verification operation |
| | C_VerifyRecoverInit | initializes a verification operation where the data is recovered from the signature |
| | C_VerifyRecover | verifies a signature on single-part data, where the data is recovered from the signature |
| Dual-purpose cryptographic functions | C_DigestEncryptUpdate | continues simultaneous multiple-part digesting and encryption operations |
| | C_DecryptDigestUpdate | continues simultaneous multiple-part decryption and digesting operations |
| | C_SignEncryptUpdate | continues simultaneous multiple-part signature and encryption operations |
| | C_DecryptVerifyUpdate | continues simultaneous multiple-part decryption and verification operations |
| Key management functions | C_GenerateKey | generates a secret key |
| | C_GenerateKeyPair | generates a public-key/private-key pair |
| | C_WrapKey | wraps (encrypts) a key |
| | C_UnwrapKey | unwraps (decrypts) a key |
| | C_DeriveKey | derives a key from a base key |
| Random number generation functions | C_SeedRandom | mixes in additional seed material to the random number generator |
| | C_GenerateRandom | generates random data |
| Parallel function management functions | C_GetFunctionStatus | legacy function which always returns CKR_FUNCTION_NOT_PARALLEL |
| | C_CancelFunction | legacy function which always returns CKR_FUNCTION_NOT_PARALLEL |

FIG. 18B

Table 2

| DSX Tag | Hex | Required | Description |
|---|---|---|---|
| File | 01 | Y | First tag, always followed by length of the file less the Tag and the size of the length field. |
| Version | 02 | Y | DSX Version - Length = 4 - presented as #.#.#.# Initial value for development is 0.0.0.1 |
| Mode | 03 | Y | DsxMode - Encrypted File / Join Request / Join Response |
| Timestamp | 04 | Y | Timestamp RFC3161 - YYYYMMDDhhmmss[.s...]Z example: 19990609001326.34352Z |
| EncryptionOid | 05 | Y | Encryption type OID aes-100 - 1.3.6.1.4.1.890.1.3.1 |
| SignatureOid | 06 | Y | DSX Signature Algorithm OID ecdsa-plain-SHA256 - 0.4.0.127.0.7.1.1.4.1.3 |
| DataHashOid | 07 | Y | Encrypted Data Hash type OID hmacWithSHA256 - 1.2.840.113549.2.9 |
| FieldName | 0A | Y | SentriX Field Name (required, will be used by KDF) |
| Data | 0C | Y | Encrypted Field Data |
| DataHash | 0D | Y | HASH of Encrypted Field |
| DataLength | 0E | Y | original length of the Data encoded in ASN1Length |
| DataDecryptPublicKey | 0F | Y | the ephemeral public key necessary to decrypt the Data, must use target private key to derive ECDH secret |
| TargetPublicKey | 14 | Y | To support only using binary key for target |
| FileSignature | 15 | Y | DSX Signature over entire file |
| DerSignature | 18 | Y | Tag to start end of file DER signature |
| VerificationGuid | 19 | Y | GUID to verify decryption key |
| SignatureOffset | 1B | Y | Offset from the start of the file to ECDSA signature. Used to verify signature before parsing contents |
| SignaturePublicKey | 1C | Y | the public key used to check the ECDSA signature on the file |

FIG. 19

SECURE DEVICE PROGRAMMING SYSTEM WITH HARDWARE SECURITY MODULE AND SECURITY INTEROP LAYER

CROSS REFERENCE TO RELATED APPLICATIONS AND PRIORITY CLAIM

This application claims the benefit of U.S. Provisional Patent Application Ser. No. 63/219,793 filed Jul. 8, 2021, the entire contents of the aforementioned are hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s)

TECHNICAL FIELD

Embodiments relate generally to device programming systems, and, more specifically, to secure programming systems with a hardware security module and a security interop layer.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Certain operations of electronic circuit board assembly are performed away from the main production assembly lines. While various feeder machines and robotic handling systems populate electronic circuit boards with integrated circuits, the operations related to processing integrated circuits, such as programming, testing, calibration, and measurement are generally performed in separate areas on separate equipment rather than being integrated into the main production assembly lines.

Customizable devices such as Flash memories (Flash), electrically erasable programmable read only memories (EEPROM), programmable logic devices (PLDs), field programmable gate arrays (FPGAs), systems-on-a-chip, microprocessors, and microcontrollers incorporating non-volatile memory elements, can be configured with separate programming equipment, which is often located in a separate area from the circuit board assembly lines. In addition, system level components, such as smart phones, circuit boards, Internet of Things (IoT) devices, media players, can also require specific security configuration support.

The systems and sub-assemblies that are manufactured or assembled in bulk on a manufacturing line are generally functionally identical. Such products share similar problems about functionality and operation. Issues manifesting in one device are typically found in all similarly manufactured devices.

BRIEF DESCRIPTION OF THE DRAWINGS

The present invention is illustrated by way of example, and not by way of limitation, in the figures of the accompanying drawings and in which like reference numerals refer to similar elements and in which:

FIG. 13 depicts an example of a security interop layer of the secure programming system in an embodiment, FIG. 14 depicts an example of a secure programming system in an embodiment, FIG. 18A depicts an example of a first portion of Table 1 showing PKCS #11 functions in an embodiment, FIG. 18B depicts an example of a second portion of Table 1 showing PKCS #11 functions in an embodiment, FIG. 19 depicts an example of Table 2 showing exemplary data types.

DETAILED DESCRIPTION

Figure 1:
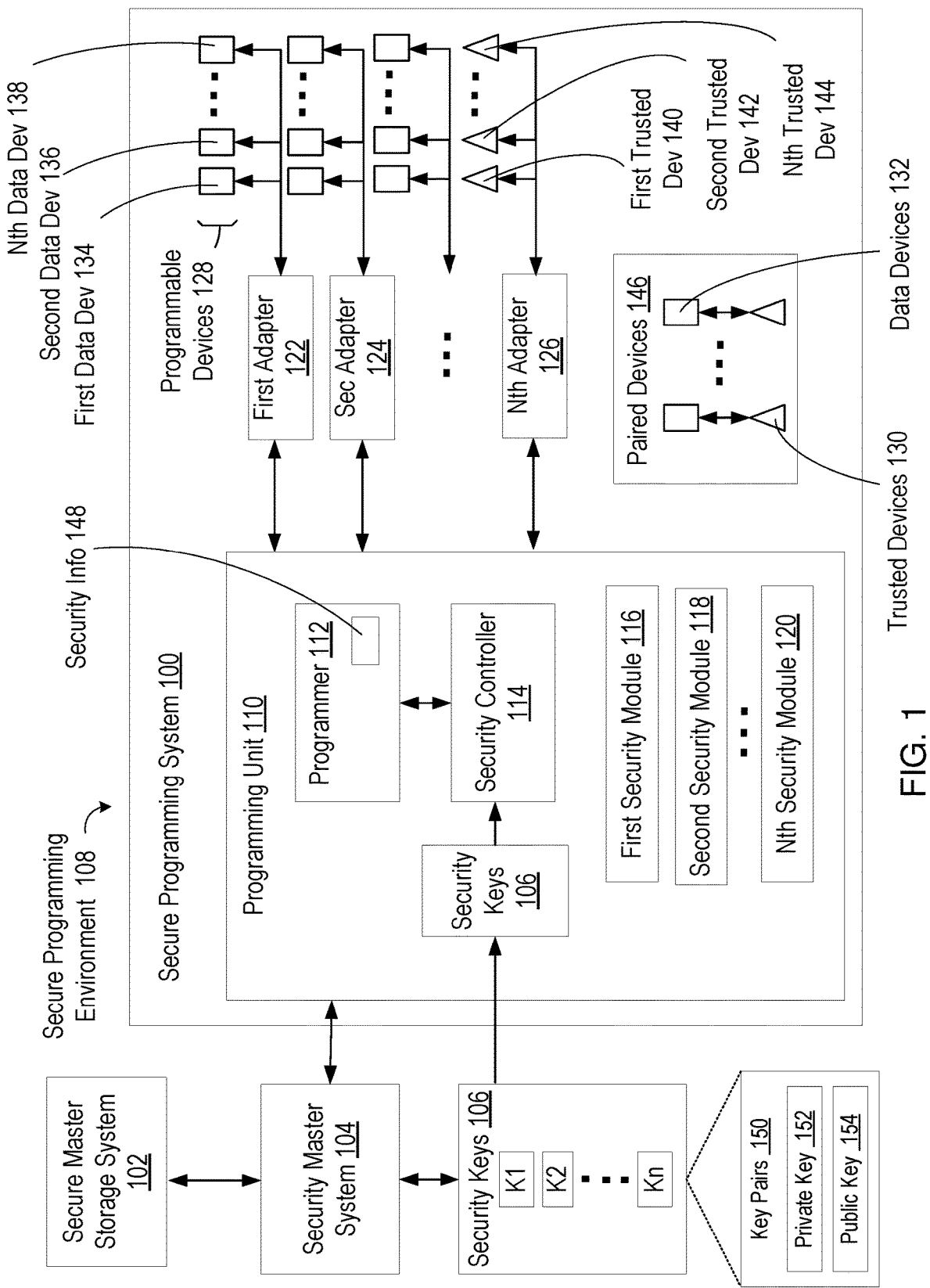
FIG. 1 depicts an illustrative view of a secure programming system, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
3.0. Implementation Mechanism
4.0. Example Embodiments
5.0. Extensions and Alternatives

1.0. General Overview

Approaches, techniques, and mechanisms are disclosed for provisioning programmable devices in a secure manner. The secure programming system can individually encrypt a target payload of data and code and then program the information into each individual one of the programmable devices. The secure programming system can create a customized payload package that can only be decrypted by a system or device having the correct security keys.

The programmable devices can include memory chips, circuit boards, and complete electronic devices such as smart phones, media players, or other consumer and industrial electronic devices. The configuration of the security keys can control the operation of the programmable devices.

The secure programming system can securely configure individual devices including components, circuit boards, and complete products. By implementing security features at the individual component manufacturing time, operation can be controlled on a device-by-device basis. The secure content, codes, and keys can interoperate to provide a high degree of security and control.

The secure programming system can use different configurations to enhance security. The device programmer can directly mount and provision the programmable devices using secure content. The device programmer and a host system can be configured to enable the device programmer to access a hardware security module in the host system to improve security performance and cryptographic functionality levels.

According to one embodiment, the programmable devices can be provisioned at a programming unit coupled to host system having a hardware security module (HSM). Both systems can be synchronized with template and mechanism dictionaries to allow abbreviated remote calls to be performed with a reduced data load to reduce complexity and improve performance.

According to another embodiment, the encryption of a job control package having the target payload can be performed at a host system by accessing the HSM of the programming unit using static template and mechanism dictionaries to access the HSM remotely.

According to one embodiment, the programmable devices can be provisioned at a plurality of the programming units with each of the programming units accessing the HSM of a centralized host system. The host system can provide the lightweight access to the cryptographic libraries and calls using the template and mechanism dictionaries that are synchronized and consistent between the device programmer and the host system. Both systems can be configured to interoperate between each other.

In other aspects, the invention encompasses computer apparatuses and computer-readable media configured to carry out the foregoing techniques.

2.0. Structural Overview

Referring now to FIG. 1, therein is shown an illustrative view of various aspects of a secure programming system 100 in which the techniques described herein may be practiced, according to an embodiment. The secure programming system 100 can individually configure data devices and active, trusted device with cryptographic information to provide a secure programming and operation environment.

The secure programming system 100 comprises a programming unit 110 having a programmer 112, a security controller 114, security keys 106, adapters for coupling to programmable devices, a first security module 116, a second security module 118, and an nth security module 120. The secure programming system 100 can be coupled to a security master system 104 having a secure master storage system 102. The security master system 104 and the secure master storage system 102 can generate and securely storage the security keys 106 for encrypting and decrypting information. The security keys 106 can implement a variety of security paradigms. For example, the security keys 106 can include key pairs 150 having a private key 152 and a public key 154. The key pairs 150 can be used to implement a public key cryptography system where data encrypted by the public key 154 can be decrypted using the private key 152. The secure programming system 100 can include as many different key pairs 150 as necessary. The key pairs 150, the private key 152, and the public key 154 can be implemented for different devices or system elements including the secure programming system 100, the programming unit 110, the programmer 112, the security controller 114, the security modules, the programmable devices 128, the data devices 132, the trusted devices 130, or any other system element.

System 100 comprises one or more computing devices. These one or more computing devices comprise any combination of hardware and software configured to implement the various logical components described herein, including components of the programming unit 110 having the programmer 112, the security controller 114, the adapters, the first security module 116, the second security module 118, and the nth security module 120. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

The programming unit 110 can be a secure system for programming data, metadata, and code onto the programmable devices 128. The programming unit 110 can request and receive security information from the security master system 104, process the information, and transfer an individually configured version of the security information to the programmable devices 128.

The programming unit 110 can include the programmer 112. The programmer 112 can be an electromechanical system for physically programming the programmable devices 128. For example, the programmer 112 can receive a tray containing the programmable devices 128, electrically couple the programmable devices 128 to an adapter unit, and transfer security information into the programmable devices 128. The programming unit 110 can receive individualized status information from each of the programmable devices 128 and customize the security information transferred to each of the programmable devices 128 on an individual device basis. For example, each of the programmable devices 128 can receive an individual block of information that is different from the information transferred to others of the programmable devices.

The programmer 112 can be coupled to one or more of the adapters that can be used to access the programmable devices 128. The adapters can include a first adapter 122, a second adapter 124, and a nth adapter 126.

In an illustrative example, the first adapter 122 can be a hardware device that can be used to electrically connect one or more of the programmable devices to the programmer 112. The programmer 112 can then transfer a version of the security information to one of the programmable devices 128. The first adapter 122 can include one or more sockets for mounting the programmable devices 128. The first adapter 122 can include a socket, a connector, a zero-insertion-force (ZIF) socket, or a similar device to mounting integrated circuits.

Although the adapters are described as electromechanical units for mounting the programmable devices 128, it is understood that the adapters can have other implementations as well. For example, if the programmable devices 128 are independent electronic devices, such as a cell phone, a consumer electronic device, a circuit board, integrated circuits, memory, microcontrollers, a CPU, a programmable logic device (PLD), a field programmable gate array (FPGA), or a similar device with active components, then the adapters can include mechanisms to communicate with the programmable devices 128. The adapters can include a cable link, a Universal Serial Bus link, a serial connection, a parallel connection, a wireless communication link, an electronic data bus interface, an optical interface, or any other communication mechanism.

The programmable devices 128 are devices that can be provisioned with secure information by the programming unit 110. For example, the programmable devices 128 can include data devices such as flash memory units, programmable read only memories, secure data storage devices, or other data storage devices.

Provisioning may include transferring data and/or code information to a device. For example, a flash memory unit can be provisioned by programming it with data.

The programmable devices 128 can also include trusted devices 130 that include security data and security programming information. For example, the programmable devices 128 can include trusted devices 130 such as cell phones, hardware security modules, trusted programming modules, circuit boards, integrated circuits, memory devices, microcontrollers, CPUs, programmable logic devices, field programmable gate arrays, or similar devices.

The data devices 132 can include any number of devices, e.g., a first data device 134, a second data device 136, and a nth data device 138. The trusted devices 130 can include any number of trusted devices, e.g., a first trusted device 140, a second trusted device 142, and up to a nth trusted device 144.

The programmable devices 128 can each be provisioned with individually customized security information. Thus, each of the programmable devices 128 can include a separate set of the security keys 106 that can be used to individually encrypt the data stored in programmable devices 128. This provides the ability to encrypt security information 148 differently on each of the programmable devices 128 to maximize security. Each of the programmable devices 128 can be personalized with individual security keys 106.

The programmable devices 128 can be configured to include paired devices 146. The paired devices 146 are two or more of the programmable devices 128 that can share one or more of the security keys 106. This can allow each of the paired devices 146 to detect and authenticate another of the paired devices 146 in the same group. Thus, data from one of the paired devices 146 can be shared with another one of the paired devices 146. This can allow functionality such as sharing information, authenticating a bi-directional secure communication channel between two or more of the paired devices 146, identifying other related devices, or a combination thereof.

In an illustrative example, the secure programming system 100 can be used to establish one of the paired devices 146 having the first data device 134, such as a system information module (SIM) chip, paired with the first trusted device 140, such as a smart phone. In this configuration, the first data device 134 and the first trusted device 140 can both be programmed with the security keys 106 for the paired devices 146. Thus, the first trusted device 140 can validate the security information 148, such as a serial number, of the first data device 134 to authenticate that the first trusted device 140 is allowed to use the other information on the first data device 134.

The programming unit 110 can include a security controller 114 coupled to the programmer 112. The security controller 114 are computing devices for processing security information. The security controller 114 can include specific cryptographic and computational hardware to facility the processing of the cryptographic information. For example, the security controller 114 can include a quantum computer, parallel computing circuitry, field programmable gate arrays (FPGA) configured to process security information, a co-processor, an array logic unit, a microprocessor, or a combination thereof.

The security controller 114 can be a secure device specially configured to prevent unauthorized access to security information at the input, intermediate, or final stages of processing the security information. The security controller 114 can provide a secure execution environment for secure code elements 314 to execute in. For example, the security controller 114 can be a hardware security module (HSM), a microprocessor, a trusted security module (TPM), a dedicated security unit, or a combination thereof. The security controller 114 can be part of the programming unit 110. For example, the security controller 114, such as a hardware security module, can be included within the programmer 112.

The security controller 114 can be coupled to security modules to provide specific security functionality. The security modules can include a first security module 116, a second security module 118, and a nth security module 120. Each of the security modules can provide a specific security functionality such as identification, authentication, encryption, decryption, validation, code signing, data extraction, or a combination thereof. For example, the security modules can be hardware, software, or a combination thereof.

For example, the first security module 116 can be configured to provide an application programming interface (API) to a standardized set of commonly used security functions. In another example, the second security module 118 can be a combination of dedicated hardware and software to provide faster encryption and decryption of data.

The programming unit 110 can include the secure storage of one or more the security keys 106. The security keys 106 can be calculated internal to the secure programming system 100, can be calculated externally and received by the secure programming system 100, or a combination thereof.

The security keys 106 can be used to encrypt and decrypt the security information. The security keys 106 can be used to implement different security methodologies and protocols. For example, the security keys 106 can be used to implement a public key encryption system. In another example, the security keys 106 can be used to implement a different security protocol or methodology. Although the security keys 106 can be described as used for a public key encryption system, it is understood that the security keys 106 can be used to implement different security paradigms.

One of the advantages of the secure programming system 100 includes the ability to provision each of the programmable devices 128 with a different set of the security keys 106 and a different version of the security information 148 encrypted by the individual security keys 106. This can ensure that the security keys 106 used to decrypt the security information 148 on one of the programmable devices 128 cannot be used to decrypt the security information on another one of the programmable devices 128. Each of the programmable devices 128 can have a separate one of the security keys 106 to provide maximum protection.

Figure 2:
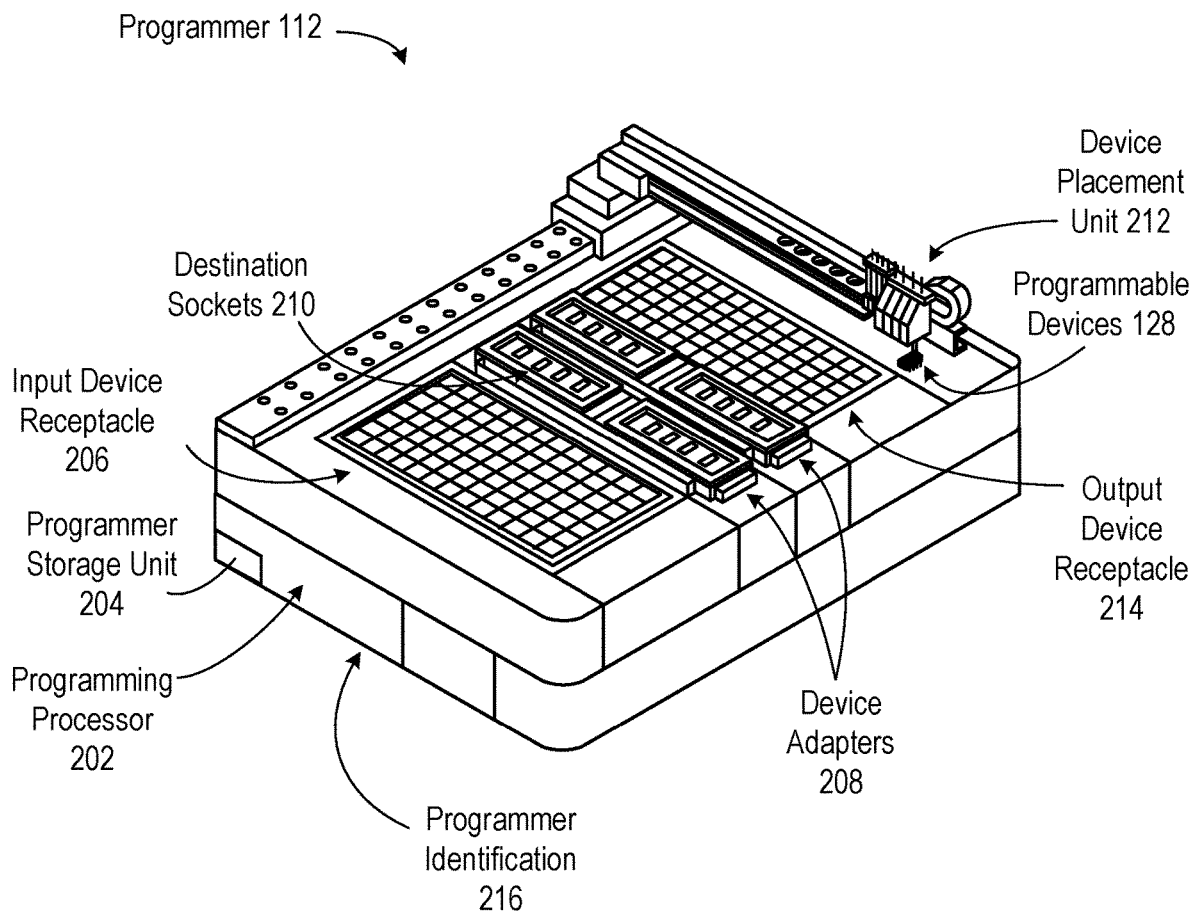
FIG. 2 depicts an example of the programmer.

Referring now to FIG. 2, therein is shown an example of the programmer 112. The programmer 112 is an electromechanical device for provisioning the programmable devices 128.

The programmer 112 can be used to access the programmable devices 128 and provision the programmable devices 128 with the content payload. The content payload can include data, code, security keys 106, the security information 148, and other related content.

The programmer 112 can have a variety of configurations. The programmer 112 can include a programming processor 202, an input device receptacle 206, device adapters 208, destination sockets 210, a device placement unit 212, and an output device receptacle 214. For example, the programmer 112 can be a programmer 112, a chip programmer, a device provisioning system, a circuit board programmer, or a similar provisioning system.

The programmer 112 can have a programmer identification 216. The programmer identification 216 is a unique value for identifying the programmer 112.

The programmer 112 can configure the programmable devices 128 by initializing and writing a data image into the programmable devices 128. The data image can be configured for the device type of the programmable devices 128. The programmer 112 can transfer the data to the programmable devices 128 using direct or indirect memory access.

The programmer 112 can receive a single payload image for the programmable devices 128 and store the image in a local programmer storage unit. The payload image can be processed into individual images targeted for each of the programmable devices 128. Configuring the programmable devices 128 can store memory structure, cryptographic data, and user data on the programmable devices 128. Configuring can include forming one-time structures such as partitions on the programmable devices 128.

The programmer 112 can include the programming processor 202. The programming processor 202 is a computing unit for controlling the programmer 112. The programming processor 202 can include a central processing unit (not shown), a programmer storage unit 204, a communication interface (not shown), and a software (not shown).

The programming processor 202 can have a variety of configurations. For example, the programming processor 202 can include the security controller or be coupled to the system controller. The programming processor 202 can be a single processor, a multiprocessor, a cloud computing element, or a combination thereof.

The programmer storage unit 204 is a device for storing and retrieving information. For example, the programmer storage unit 204 of the programmer 112 can be a disk drive, a solid-state memory, an optical storage device, or a combination thereof.

The programmer 112 can include the software for operating the programmer 112. The software is control information for executing on the programming processor 202. The software can be stored in the programmer storage unit 204 and executed on the programming processor 202.

The programmer 112 can include the input device receptacle 206. The input device receptacle 206 is a source of the programmable devices 128. For example, the input device receptacle 206 can be a tray that conforms to the Joint Electron Device Engineering Council (JEDEC) standards. The input device receptacle 206 can be used for holding unprogrammed devices.

The programmer 112 can include the output device receptacle 214. The output device receptacle 214 is a destination for the programmable devices 128 that have been provisioned. For example, the output device receptacle 214 can be an empty JEDEC tray for holding finished devices, a storage tube, a shipping package, or other similar structure.

The programmer 112 can include the device adapters 208. The device adapters 208 are mechanisms for coupling to the programmable devices 128.

The device adapters 208 can have a variety of configurations. For example, the device adapters 208 can include destination sockets 210 for mounting the programmable devices 128 such as chips. The sockets are mechanisms for holding and interfacing with the programmable devices 128. The device adapters 208 can be modular and removable from the programmer 112 to accommodate different socket configurations. The device adapters 208 can include a latch mechanism (not shown) for attaching to the programmer 112.

The destination sockets 210 can hold the programmable devices 128. The destination sockets 210 can be used to read or write new information to the programmable devices 128.

The programmer 112 can include the device placement unit 212. The device placement unit 212 is a mechanism for positioning the programmable devices 128 in one of the destination sockets 210.

The device placement unit 212 can be implemented in a variety of ways. For example, the device placement unit 212 can be a robotic arm, a pick and place mechanism, or a combination thereof. Although the device placement unit 212 can be described as a rail-based positioning system, it is understood that any system capable of positioning one of the programmable devices 128 in the destination sockets 210 can be used.

The device placement unit 212 can retrieve one or more of the programmable devices 128 that are blank from the input device receptacle 206. The device placement unit 212 can transfer the programmable devices 128 to the destination sockets 210 of the device adapters 208.

Once the programmable devices 128 are engaged and secured by the device adapters 208, the device programming process can begin. The programmer 112 can program a local copy of the information into the programmable devices 128 in one of the destination sockets 210. For example, the local copy of the programming information can be in a pre-programmed master device, from a file in local storage, or from a remote server.

Once programming is complete, the device placement unit 212 can transport the programmable devices 128 that have been programmed to the output device receptacle 214. The device placement unit 212 can transports any of the programmable devices 128 that have errors to a reject bin (not shown).

The programmer 112 can include a programmer identification 216. The programmer identification 216 is a unique value for the programmer 112. The programmer identification 216 can be used to identify the programmer 112. The programmer identification 216 can be incorporated into a device identification of each of the programmable devices 128 to indicate which programmer 112 was used to program the devices.

Figure 3:
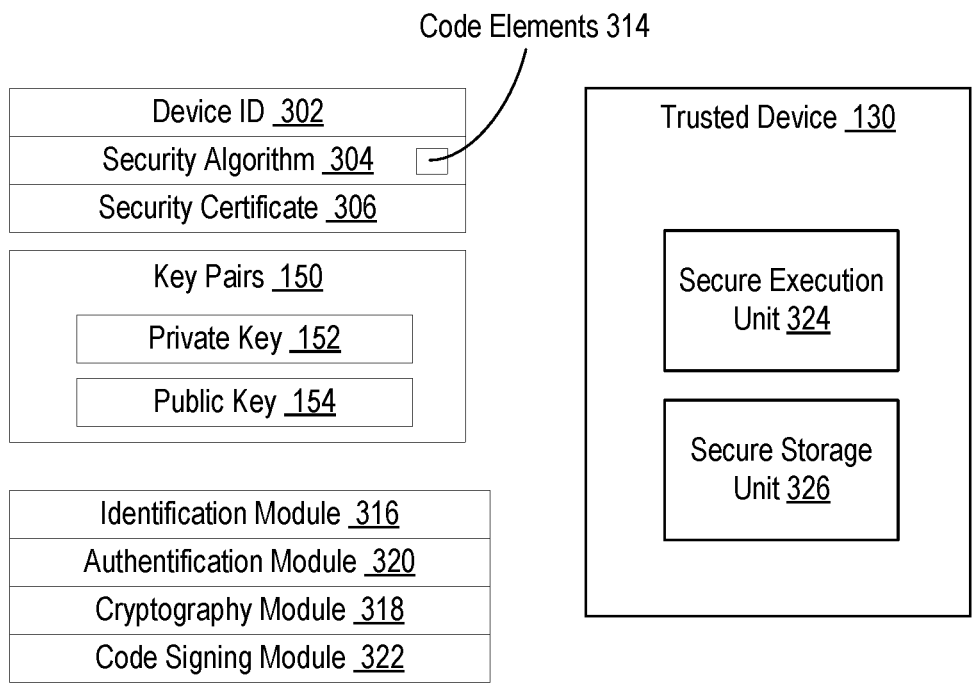
FIG. 3 depicts an example of a trusted device.

Referring now to FIG. 3, therein is shown an example of one of the trusted devices 130. The trusted devices 130 are components having the secure storage unit 326 and the secure execution unit 324. The trusted devices 130 are active components capable of executing secure code in the secure execution unit 324 to perform operations on the secure data in the secure storage unit 326.

The trusted devices 130 can be provisioned by the secure programming system 100 to include security information. For example, the trusted devices 130 can include the device identification 302, security algorithms 304, a security certificate 306 and the key pairs 150 each having the private key 152 and the public key 154.

In an illustrative example, the security keys 106 can comprise one or more of the key pairs 150 for a public key encryption system. The security information can be encrypted with the public key 154 of one of the key pairs 150 and decrypted using the private key 152. However, it is understood that the system can take advantage of different security paradigms including symmetric encryption, asymmetric encryption, data encryption standard (DES), hash codes, PGP, or other cryptographic systems. In a further example, the key pairs 150 can be used to provide a digital signature using two different sets of the security keys 106. In the digital signature example, a message or payload can be encrypted using the private key 152 of a first element and the public key 154 of a second element. The resulting encrypted message can be decrypted using the public key 154 of the first element and the private key 152 of the second element. If the message is successfully decrypted, then it shows that the message was encrypted by the first element thus established the digital signature.

The device identification 302 is a data value that can uniquely identify each of the trusted devices 130 individually. For example, the device identification 302 can include serial numbers, markers, security codes, or a combination thereof.

The security algorithms 304 are secure code elements 314. The security algorithms 304 can provide an application programming interface to external systems to control security functionality on the trusted devices 130. The security algorithms 304 can be customized to each of the trusted devices 130. For example, the security algorithms 304 can include the code elements 314 such as source code, executable code, a library module, a link module, configuration files, initialization data, hardware control codes, or a combination thereof.

The security certificate 306 is a security object associated with one of the trusted devices 130. The security certificate 306 can be pre-programmed to certify that a device has a particular root of trust embedded in it. The security certificate 306 can have one or more of the public key 154 in them. The security certificate 306 can include security data such as key pairs 150, security keys 106, encrypted passwords, or a combination thereof.

The security certificate 306 can be a securely stored data element. For example, the security certificate 306 can be encrypted security information that must be decrypted before use.

The key pairs 150 can be security elements having two or more separate security keys used to encrypt and decrypt data. For example, the key pairs 150 can include the private key 152 and the public key 154. The security information encrypted with the public key 154 can be decrypted using the private key 152.

The key pairs 150 can be implemented in a variety of ways. For example, the key pairs 150 can be configured to have different key lengths to change the level of security. The private key 152 and the public key 154 can be implemented with the same or different character lengths.

Although the key pairs 150 are described in the context of a public key encryption system, it is understood that the key pairs 150 can also be used to implement other encryption paradigms. For example, the key pairs 150 can be used for symmetric encryption, asymmetric encryption, standards-based encryption, hashing algorithms, or any other encryption system.

The trusted devices 130 can include security functionality implemented as security modules. For example, the trusted devices 130 can include an identification module 316, an authentication module 320, a cryptography module 318, and a code signing module 322.

The identification module 316 can verify the identification of one of the programmable devices 128. The identification module 316 can receive the device identification 302 of one of the programmable devices 128 and determine if the device identification 302 is correct. For example, the device identification 302 can be compared to a list of known devices, compared against a checksum, compared using a computational algorithm, or similar techniques.

The authentication module 320 can authenticate one or more of the properties of one of the programmable devices 128. The authentication module 320 can receive the device identification 302, the security parameters including one or more of the security keys 106 to determine if the security parameter provided is valid. The authentication module 320 can also be used to validate the device identification 302.

The validity of the security parameter can be determined in a variety of ways. For example, the validity of the security parameter can be validated by successfully decoding the security parameter using one of the security keys available to one of the trusted devices 130. In another example, the validity of the security parameters can be validated by decrypting one of the security parameters and comparing it to a predefined value stored within one of the trusted devices 130.

The cryptography module 318 is a unit for performing cryptographic operations. The cryptography module 318 can provide an interface to perform computationally intensive operations such as encryption and decryption. The other security modules can be coupled with the cryptography module 318 to provide security functionality.

The cryptography module 318 can be implemented in a variety of ways. For example, the cryptography module 318 can include hardware, software, or a combination thereof. The cryptography module 318 can provide a standardized interface to allow the other security modules to perform the required cryptographic functions.

The code signing module 322 is a unit for securing code elements 314. The code signing module 322 can encrypt code elements, decrypt code elements, and control the execution of the code elements. The code signing module 322 can be used to ensure that one of the code elements 314 can be executed on one of the trusted devices 130 by verifying that the security information associated with the code element 314.

In an illustrative example, each of the code elements 314 can include an execution parameter that indicates the model number of the trusted devices 130 where the code elements 314 are authorized to execute. The code signing module 322 can be used to validate the execution parameter, compare the parameter to the model number information in one of the trusted devices 130, and only allow execution of the code elements 314 if the two values match. This could be used to limit operation of the code element 314 to a particular high-end phone or other specific device.

One of the advantages of the trusted devices 130 is that the trusted devices 130 can identify and authenticate the security information internally to increase the level of security. The trusted devices 130 can validate the security information using the security keys 106 stored in the secure storage unit 326.

The trusted devices 130 can provide a measure of trust when the trusted devices 130 are secure. The trusted devices 130 can have a variety of configurations. For example, the trusted devices 130 can have a system identification, an authentication mechanism, encryption and decryption functionality, code signing to protect executables, trusted storage, and a trusted execution environment.

The system identification can include elements that identify or describe hardware and software components. The trusted devices 130 can have the ability to securely authenticate its identity and other properties. The trusted devices must be able to securely encrypt and decrypt information. The trusted devices 130 must be able to authenticate trusted code. The trusted devices must have secure storage and execution capability.

The secure programming system 100 must be able to implement a system of roots of trust. The roots of trust (RoT) are a set of functions in a trusted computing environment that are always trusted by the system. For example, the roots of trust can serve as a separate secure compute engine controlling the trusted computing platform cryptographic process. Alternatively, devices can implement the roots of trust as hardware and software components that are inherently trusted. They are secure by design and can be implemented in hardware or protected by hardware. They can be used to perform security critical functions such as measuring or verifying software, protecting cryptographic keys, and performing device authentication.

The roots of trust can provide a variety of security functionality including on the fly encryption, detection and reporting of tampering with secure data, detection of active tampering attempts, digital rights management, and other security functions.

Implementing secure operation in a mobile hardware space is difficult because of the higher risk resulting from physical access to the devices. Such secure devices require the hardware to work closely with protected data and software to insure secure operation.

Figure 4:
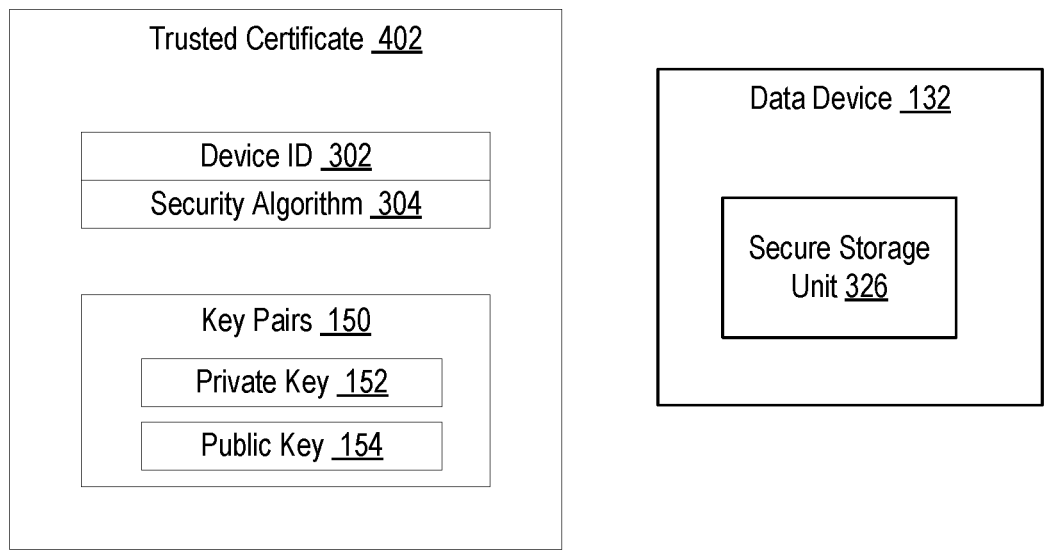
FIG. 4 depicts an example of a data device.

Referring now to FIG. 4, therein is shown an example of one of the data devices 132. The data devices 132 are components having the secure storage unit 326. The data devices 132 are passive components capable storing the secure data in the secure storage unit 326 and providing access to the stored data when accessed by one of the trusted devices 130.

The data devices 132 can be provisioned by the secure programming system 100 to include security information. For example, the data devices 132 can include the device identification 302, the security algorithms 304, the security certificate 306, and the key pairs 150 each having the private key 152 and the public key 154. In this case, the data within the secure storage unit 326 may be internally accessed from within the data devices 132.

The secure storage unit 326 can be used as a write once data area. Information can be programmed into the secure storage unit 326 and then the secure storage unit 326 can be processed to eliminate the access to the data within the secure storage unit 326 from outside the data devices 132.

In an illustrative example, one of the data devices 132 can be a flash memory device. Within the flash memory device, the flash memory can be partitioned into different blocks. Some of the blocks can be used to provide general memory space. Some of the other blocks may be configured to be private and used to store information that is not accessible from outside the flash memory device. A private block can be used to form the secure storage unit 326.

In another example, the secure storage unit 326 can be a dedicated memory area on one of the data devices 132 that is protected by a security fuse. The data can be written to the secure storage unit 326 and then external access can be eliminated by blowing the security fuse.

Each of the data devices 132 can include a trusted certificate 402. The trusted certificate 402 is a data structure that can include other security parameters. For example, the trusted certificate 402 can include the device identification 302, the security algorithms 304, and the key pairs 150.

3.0. Implementation Mechanism

Figure 5:
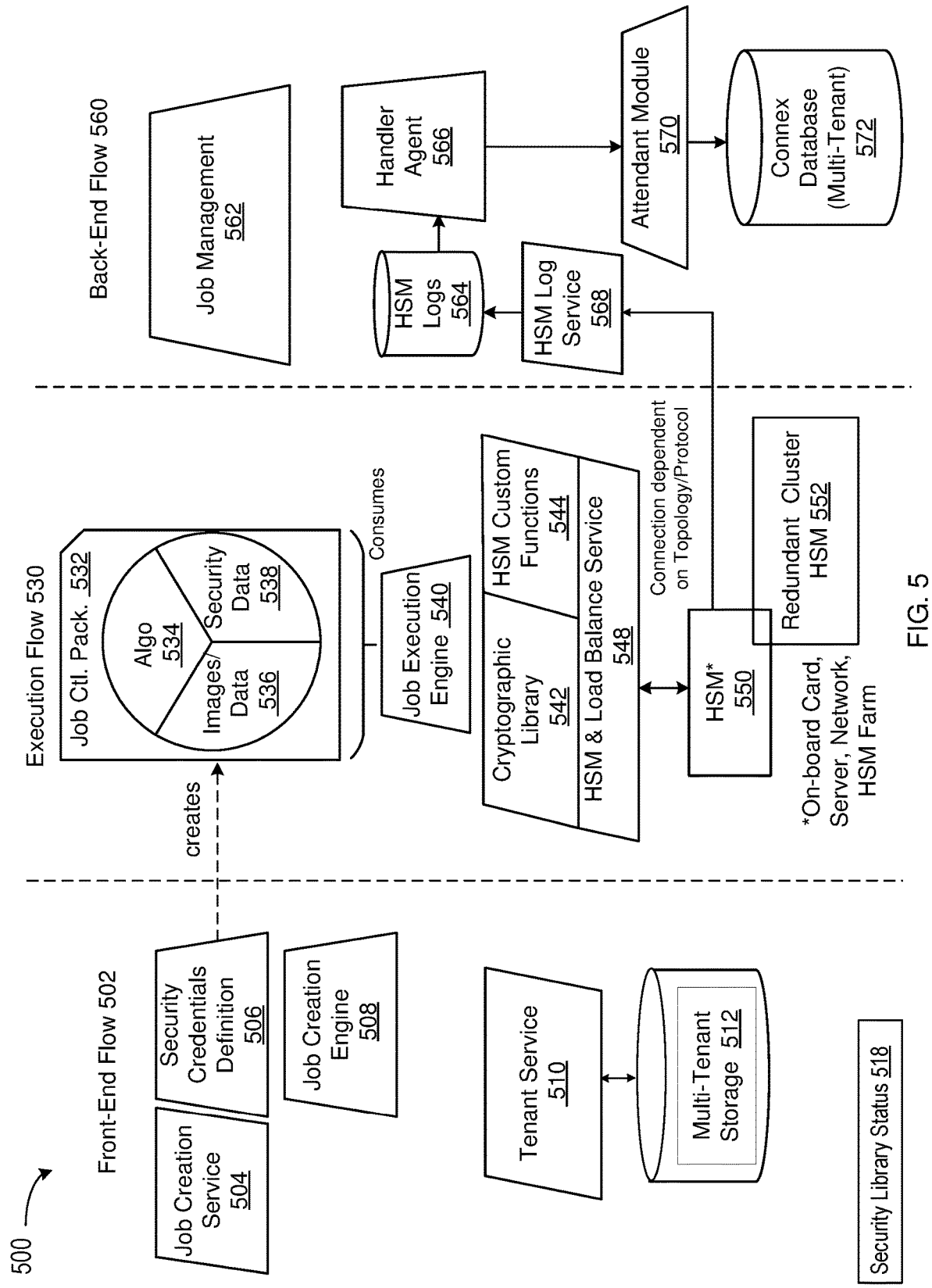
FIG. 5 depicts an example of process flows for the secure programming system.

Referring now to FIG. 5, therein is shown an example of process flows for the secure programming system 500. The three process flows show a front-end flow 502, an execution flow 530, and a back-end flow 560.

The front-end flow 502 can be responsible for creating a job control package 532. A job creation service 504 can be coupled to a job creation engine 508 and security credentials definitions 506 to create the job control package 532. The job creation engine 508 can be a combination of hardware and software units that allow a user, such as an OEM client, to build the job control package 532 to control the secure programming system to provision the programmable devices with a target payload.

The job control package 532 is a data object that can contain the information needed to provision a set of the programmable devices 128. The job control package 532 can include security algorithms 534, images 536, and security data 538. The security data 538 can include key pairs, public keys, security keys, passwords, data parameters, biometric information, or other similar security information.

The job control package 532 can include algorithms 534, images and data, and security information. The contents of the job control package 532 can be encrypted, unencrypted, or a combination thereof. The job control package 532 can itself be encrypted or unencrypted, depending on the desired level of security.

The algorithms 534 are control information that can be customized for a particular secure programming system and particular programmable devices. Providing the algorithms 534 in the job control package 532 can allow for greater flexibility and higher levels of security.

The job control package 532 can include images 536 and data that can be used for provisioning the programmable devices. The images and data can include executable code, images, video, data parameters, device parameters, partial or complete device image code for a particular device, or a combination thereof.

The front-end flow 502 can include a tenant service 510 configured with a multi-tenant storage unit 512. The multi-tenant storage unit 512 can include profiles describing the different tenants. Each of the tenants can be a user authorized to create the job control package 532 in a secure fashion that is isolated and protected from other tenants. A multi-tenant configuration can provide a more efficient use of the computing resources.

The tenant service 510 can support multitenancy by allowing multiple users, or tenants, to use a single copy of an application but have separate data states. The application is configured to isolate and protect the data from each tenant from the others. In another embodiment, the multi-tenant configuration can allow the application functionality to be offered in a software as a service paradigm. This can reduce hardware costs and provide a more efficient computing model.

In an embodiment, the multi-tenant configuration for the secure provisioning means that the security features can be deployed from an application with each tenant running separate from the others. The specific tenant data can be stored in the multi-tenant storage unit and retrieved securely when required.

The execution flow 530 can receive the job control package 532 to the front-end flow 502. The execution flow 530 can use the information in the job control package 532 to authenticate the contents of the job control package 532 and provision the programmable devices.

In an embodiment, the job control package 532 can include one or more security keys to decrypt the images and the data of the contents. The secure programming system can extract and decrypt the security keys from a portion of the job control package 532 using yet another security key.

The execution flow 530 can be implemented using a job execution engine 540 which can consume the job control package 532 and cause the provisioning of the programmable devices. The job execution engine 540 can be a combination of hardware and software that can execute the algorithms of the job control package 532 and use the images, data, and security data to control a programming unit to provision the programmable devices. In another embodiment, the job execution engine 540 can be a controller within the programming unit.

In some embodiments, the job execution engine 540 can be coupled to a cryptographic library 542, a HSM customer functions library, and an HSM and Load Balance service 548. In some embodiments, the cryptographic library 542 and the HSM custom functions 554 can be configured to execute cryptographic functions on an HSM 550 when called from remotely from the device programmer. In addition, the HSM and Load Balance service module 548 can manage the utilization of the HSM 550. The HSM 550 can be coupled to host system in with the connection dependent on the topology and the protocol being used. In some configurations, the HSM 550 can be an on-board card, server, network device, a HSM farm or other similar device configuration.

In an embodiment, the execution flow 530 can include a hardware security module 550 for providing secure cryptographic services. The hardware security module 550 is a computing device that safeguards and manages digital security keys, performs cryptographic functions such as encryption, decryption, hash, encoding, key management, key exchange, or a combination thereof. In some embodiments, the secure programming system 500 can include one or more redundant cluster HSMs 552.

The hardware security module 550 (HSM 550) can be configured in a variety of ways. In an embodiment, the hardware security module can be implemented as a redundant cluster of hardware security modules 552. In other embodiments, the hardware security module can be an on-board card, a server, a network unit, a hardware security module farm, or a combination thereof.

The job execution engine 540 can be configured to use the hardware security module to perform security and cryptographic functions. The job execution engine 540 can be configured to use a variety of security libraries and models. The job execution engine 540 can be coupled to different security libraries and utilize different communication techniques to interface with the hardware security module.

In an embodiment, the job execution engine 540 can be coupled to a security library and be linked to a set of HSM custom functions 544 and a HSM & Load Balance service module 548. The HSM custom functions 544 can be configured to include code to enable calls to the security library from other parts of the secure programming system including the job execution engine 540.

In some embodiments, the HSM custom functions 544 can provide interoperability functions for accessing native HSM functionality. In other example, the HSM custom functions 544 can provide more complex functionality than the basic functionality provided in the security library.

The HSM & Load Balance service module 548 can be configured in a variety of ways. In some embodiments, the HSM & Load Balance service module 548 can balance some of the security functionality over a plurality of the hardware security modules including load balancing over the reeducate cluster hardware security modules.

In another embodiment, the secure programming system 100 can be coupled to a cryptographic library 542, such as the Public Key Cryptography Standards #11 library (PKCS #11 library). The cryptographic library 542 provides a programming interface to create and manipulate cryptographic tokens. The implementation of the PKCS #11 library can be tailored to take advantage of different hardware security modules. The PKCS #11 library can provide Cryptoki application programming interface (API) for accessing the cryptographic functionality and the hardware security module.

The PKCS #11 library can interface with a cryptographic device. The cryptographic device is a device for storing cryptographic information and performing cryptographic functions. The cryptographic device can include a hardware security module 550, a smart card, a server, a smart device, a computer, a smart disk, security software, a cloud security unit, or a combination thereof.

The PKCS #11 security library can implement a variety of functions. In an embodiment, some of the exemplary functions supported by the PKCS #11 security library are described in Table 1a and Table 1b.

Execution of the Cryptoki security library function calls 520 can return different statuses, such as a security library status 518. This can include an OK status, a Not_OK status, a function not supported status, or a general error status.

The secure programming system 500 can include the back-end flow 560. The back-end flow 560 can manage information about the operation of the secure programming system 500 including data on the jobs that have been executed. The back-end flow 560 can include a job management unit 562 that can manage information such as the job control package 532s, device count, and other information.

The back-end flow 560 can receive log information and log files from the hardware security module 550 and use a HSM log service 568 to manage a HSM log database 564.

The back-end flow 560 can also include a handler agent 566 for managing information and reporting. The handler agent 566 can collect device programming records, allow handler configuration, and put audit files for each of the handler agents 566 to the attendant module 570. query and receive information from the HSM logs database 564.

The handler agent 566 can send the processed information to an attendant module 570 which can access the processed information in a multi-tenant database 572. The attendant module 570 can aggregate individual log and audit files from one or more of the handler agents 566. This can include device data, handler data, and security data.

The information in the multi-tenant database 572 can be partitioned by tenants and support multi-tenant configurations. The ConneX system can be a combination of software and hardware for connecting different system elements of one or more of the secure programming systems for reporting purposes.

In another embodiment, such as in a programming center model, an administrator can generate a security profile template to be completed by an OEM user. The security profile template can include the identification of a specific HSM, device algorithm and version identifier, and an HSM certificate to allow access to the HSM. In another embodiment, the security profile template can include the identification of the target device programming system to limit the production of the programmable devices to a specific system.

The OEM user can then modify the security profile template to generate a security deployment package that can be returned to the administrator. The security deployment package can include security files, keys, certificates, and data assets to be provisioned, and other information. The administrator can then build a secure provisioning job based on the security deployment package. In an example, the secure provisioning job can also be represented with the job control package 532.

The job control package 532 can then be used within the secure programming system to securely provision the programmable devices. Once the job has been processed, the reporting system can log the information and generate reports as needed.

Figure 6:
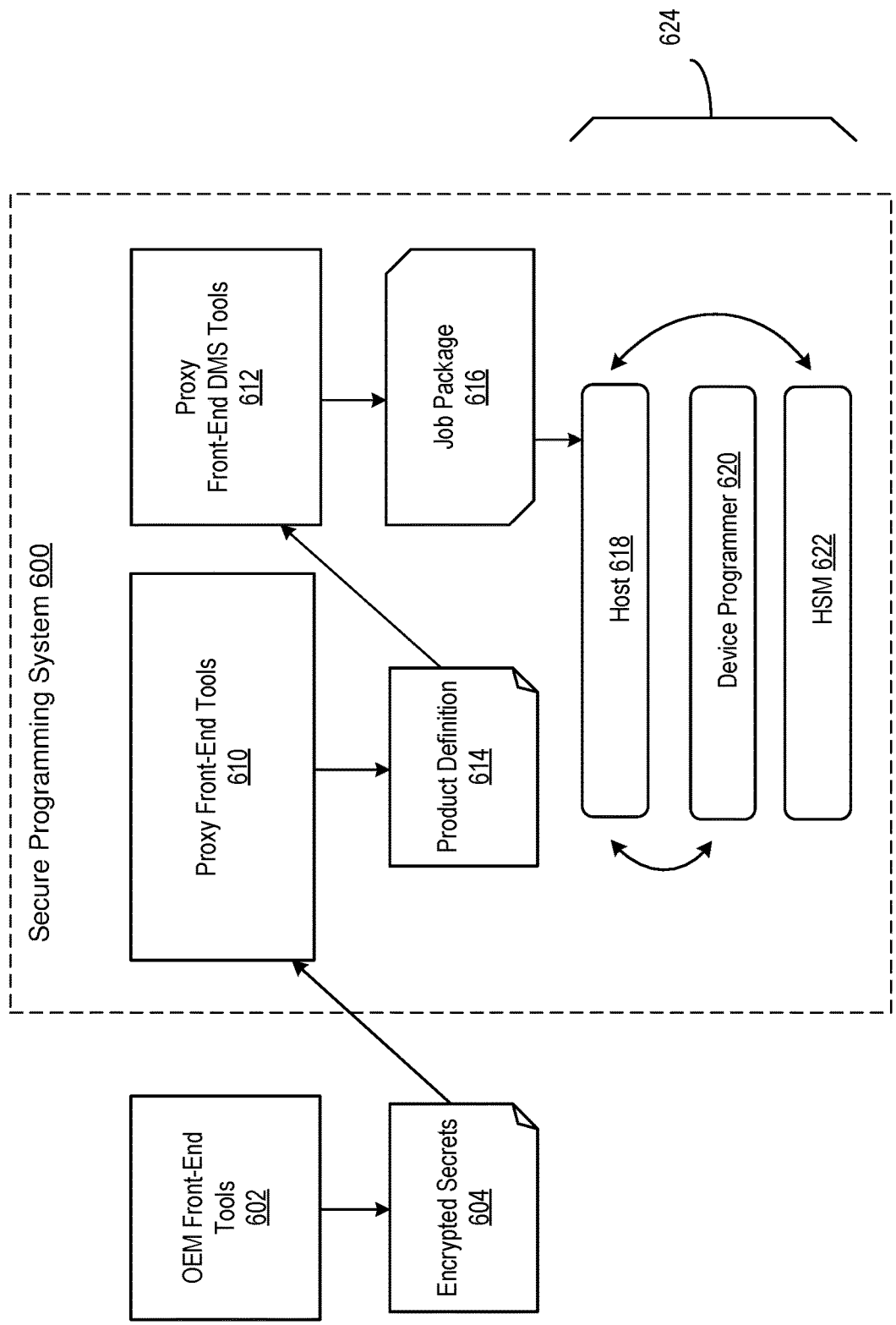
FIG. 6 depicts an example of an embodiment of the secure programming system.

Referring now to FIG. 6, therein is shown an example of an embodiment of the secure programming system 600. The secure programming system 600 can receive encrypted payloads from an OEM user and securely provision the content into programmable devices.

The secure programming system 600 can include OEM front-end tools 602 for generating encrypted secrets 604, such as OEM secrets, jobs, content and payloads. The OEM front-end tools 602 can be part of an integrated programming subsystem or tools deployed on a separate host computer for generating and protecting the encrypted secrets 604 of the OEM user.

In some embodiments, the secure programming system 600 can include proxy front-end tools 610 including security definition tools that can receive and process the encrypted secrets 604 to generate a product definition 614. The product definition 614 can includes portions of the OEM encrypted secrets intended for the target devices.

The product definition can be received by the proxy from end DMS tools 612. These data management software tools can repackage the product definition in to a job package 616 for the programmer device used by the system. The proxy front-end DMS tools 612 can customize and properly format the job package 616 for use by a programming unit 624 having the device programmer 620.

The secure programming system 600 can include proxy front-end DMS tools 612. front-end subsystem can be used by a user to create a job control package 532 having content and security information. The job control package 532 can optionally be partially or completely encrypted to protect the content. The job control package 532 can include encrypted secrets represented content and security information that is encrypted for protection. The job control package 532, such as the encrypted secrets, can be passed to the programming unit 624.

The programming unit 624 can include data management tools, such as a proxy front-end data management software (DMS) tools 612 for job creation. These tools can receive the product definition 614 and form the job package 616 for the current execution environment. The job package 616, such as the job control package 532, can be transferred to the programming unit host 618, which can be linked to the device programmer 620 and a hardware security module 622. The job control package 532 can also be known as a job package, operational package, control information, or other similar terms.

Figure 7:
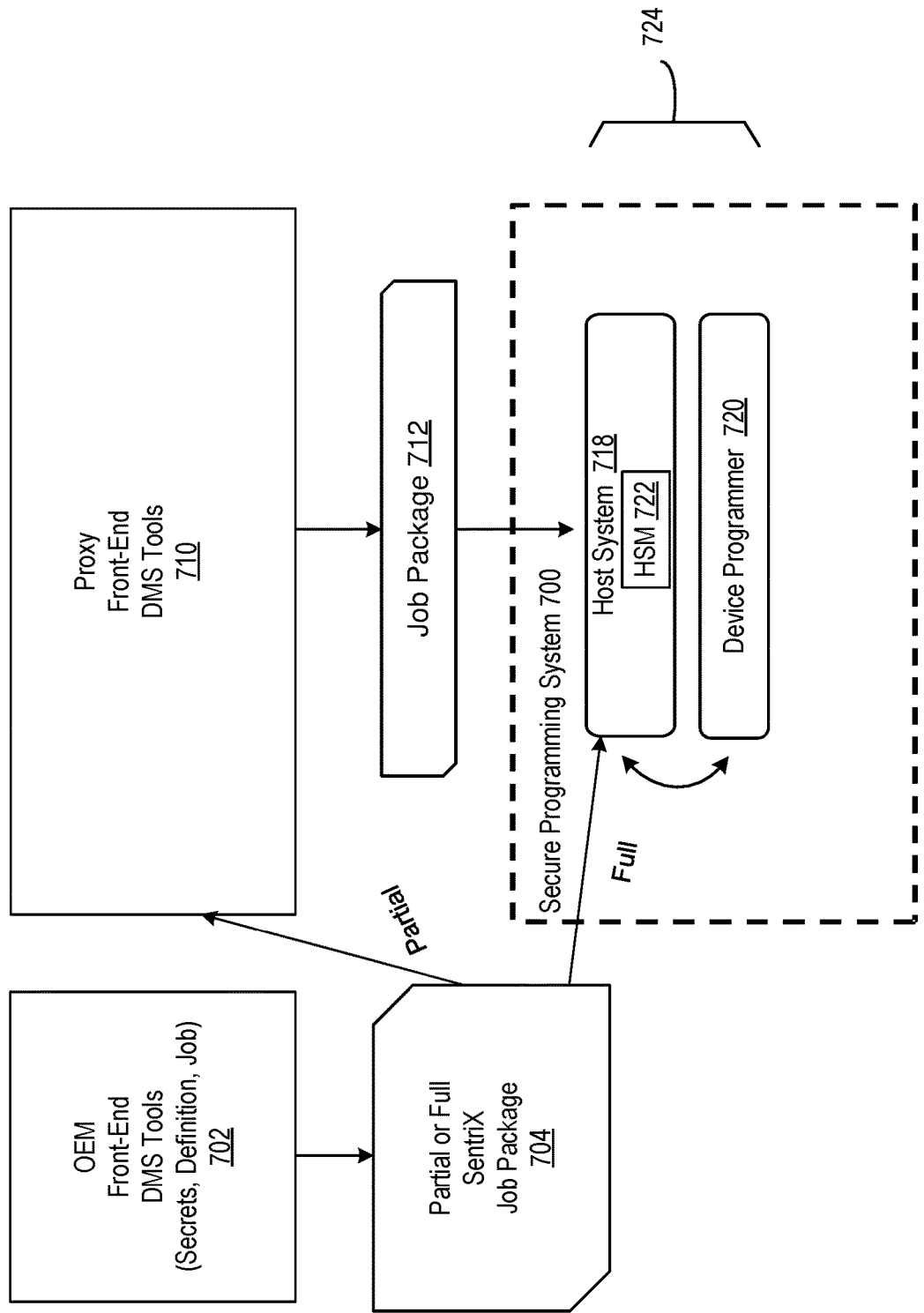
FIG. 7 depicts an example of another embodiment of the secure programming system.

Referring now to FIG. 7 therein is shown an example of another embodiment of the secure programming system 700 with external tools. The secure programming system 700 can include a programming unit 724 having the host system 718 with an HSM 722. This can represent a customer view of the secure programming system 700. Users can interface with the secure programming system 700 using OEM front-end DMS Tools 702 and Proxy front-end DMS tools 710 to create and send job packages 704 to the secure programming system.

The secure programming system 700 can include OEM front-end data management tools for managing secrets, definitions, and job information. These can include tools for OEM clients, programming center clients, or other system user clients. The front-end DMS tools can be used to create full job packages or partial job packages having the client's secrets, definitions, and job information. The full job packages can be transferred directly to the security provisioning system. The partial job packages can be completed using the Proxy-front end DMS tools.

In the case of partial job packages, the partial job packages can be transferred to another set of the proxy front-end data management tools 710 for further processing to create a full job package 712. The full job package can then be transferred to the security provisioning system.

The security provisioning system 700 can include a security provisioning host having an integrated hardware security module which is coupled to the device programmer 702. The security provision system can authenticate, validate, and verify the information in the full job package and transfer the information to the device programmer for provisioning in the programmable devices 128.

Figure 8:
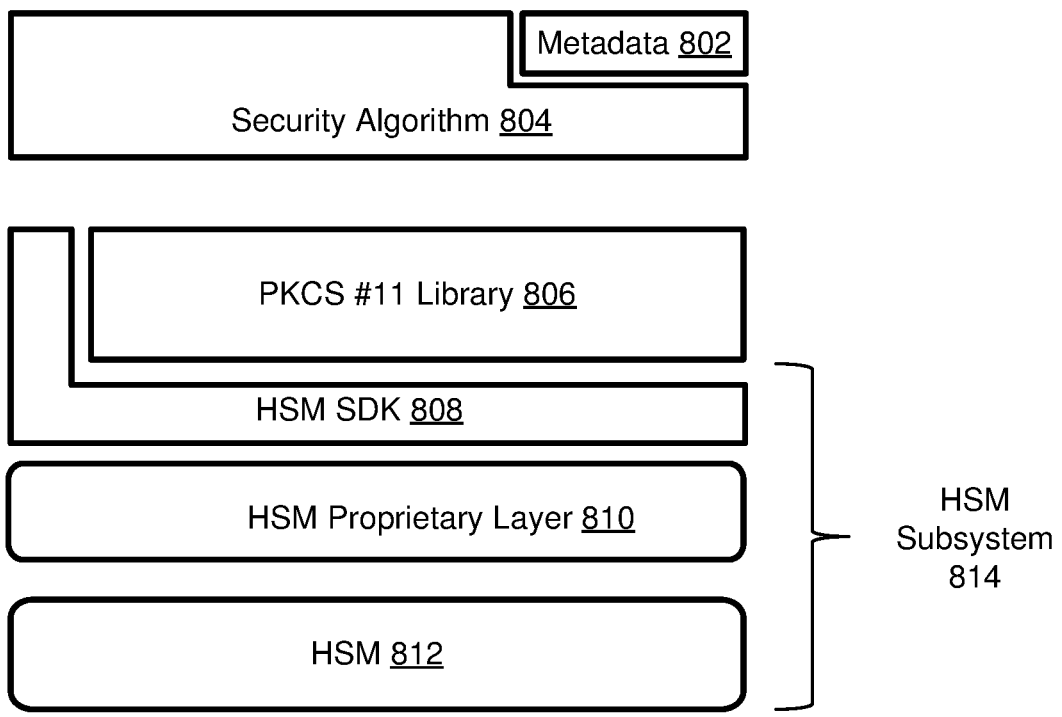
FIG. 8 depicts an example of a security stack for accessing the hardware security module subsystem.

Referring now to FIG. 8, therein is shown an example of a security stack 800 for accessing the hardware security module subsystem 814. The security stack 800 can also be an interop stack to simplify the process of accessing the functionality of the hardware security module subsystem 814.

In an embodiment, the security stack 800 can include a set of security algorithms 804 linked to metadata 802. The allow an abstracted access to the hardware security module subsystem 814. This can simplify operation and reduce complexity when using different types of the hardware security modules 812.

The interop stack is a set of components that allows for the interoperability between elements that may not be directly compatible. The interop stack, also known as an interop layer, can convert data and data structures to compatible formats, provide default values, remap function calls, manage the transfer of local and remote procedure calls, manage session information, or other housekeeping tasks.

The security stack 800 can include the cryptographic library 806, such as a PKCS #11 library, which provides security and cryptographic functionality and is coupled to the vendor specific hardware service modules 812. The cryptographic library 806 can be coupled to a hardware security module SDK 808 which can be in term coupled to a hardware security module proprietary layer 810.

The hardware security module proprietary layer 810 can be further coupled to the vendor specific version of the hardware security module subsystem 814. This improves the degree of device independence for the particular one of the hardware security module 812 being used.

Figure 9:
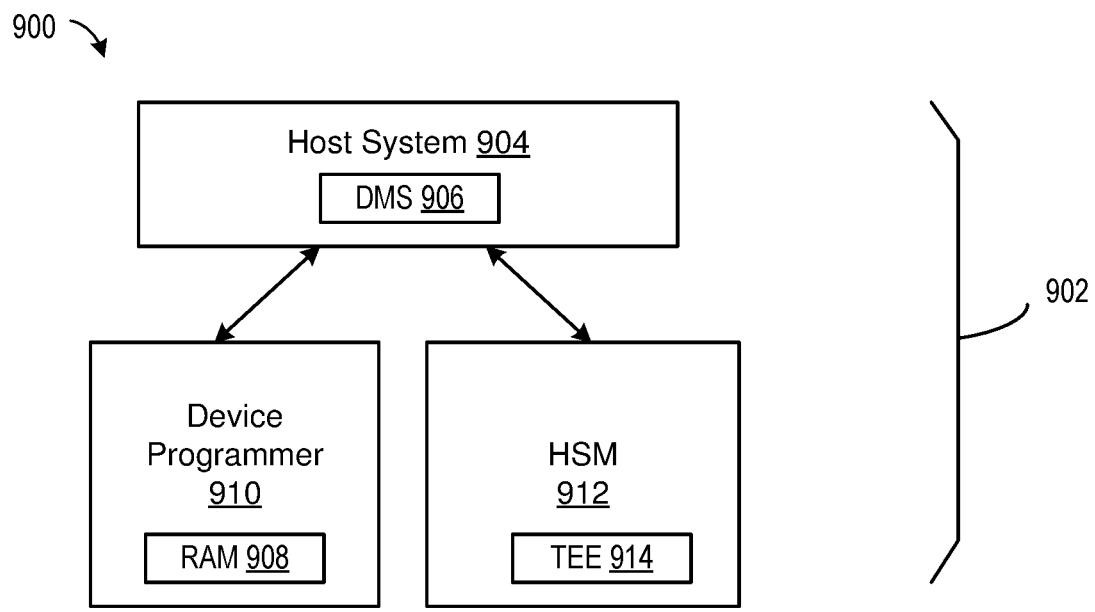
FIG. 9 depicts an example of an execution environment for the secure programming system in an embodiment.

Referring now to FIG. 9, therein is shown an example of an execution environment 902 for the secure programming system 900 in an embodiment. The execution environment 902 can support applications running on different subsystems and communicating with one another.

In an embodiment, the secure programming system 90 can be executed across three processing environments. This can include a host system 904 running the DMS 906, a random-access memory 908 (RAM 908) of the device programmer 910, and a trusted execution environment 914 (TEE 914) in the hardware security module 912.

The execution environment 902 can include a data management software 906 running on the host system 904. The data management system 906 can be responsible for job loading, dynamic data, and the hardware security module interface.

The execution environment 902 can include code executing in the RAM 908 of the device programmer 910. The device programmer 910 can be responsible for the job execution sequence, executing algorithms for programming devices, or a combination thereof.

The execution environment 902 can include the trusted execution environment 914 (TEE 914) on the hardware security module 912. The TEE 914 is computing element that can execute secure code while protected from external threats. The TEE 914 can be responsible for manipulation of secrets and other secure information and executing cryptographic functions. Executing code in the TEE 914 provides a higher degree of security.

Figures 10, 11:
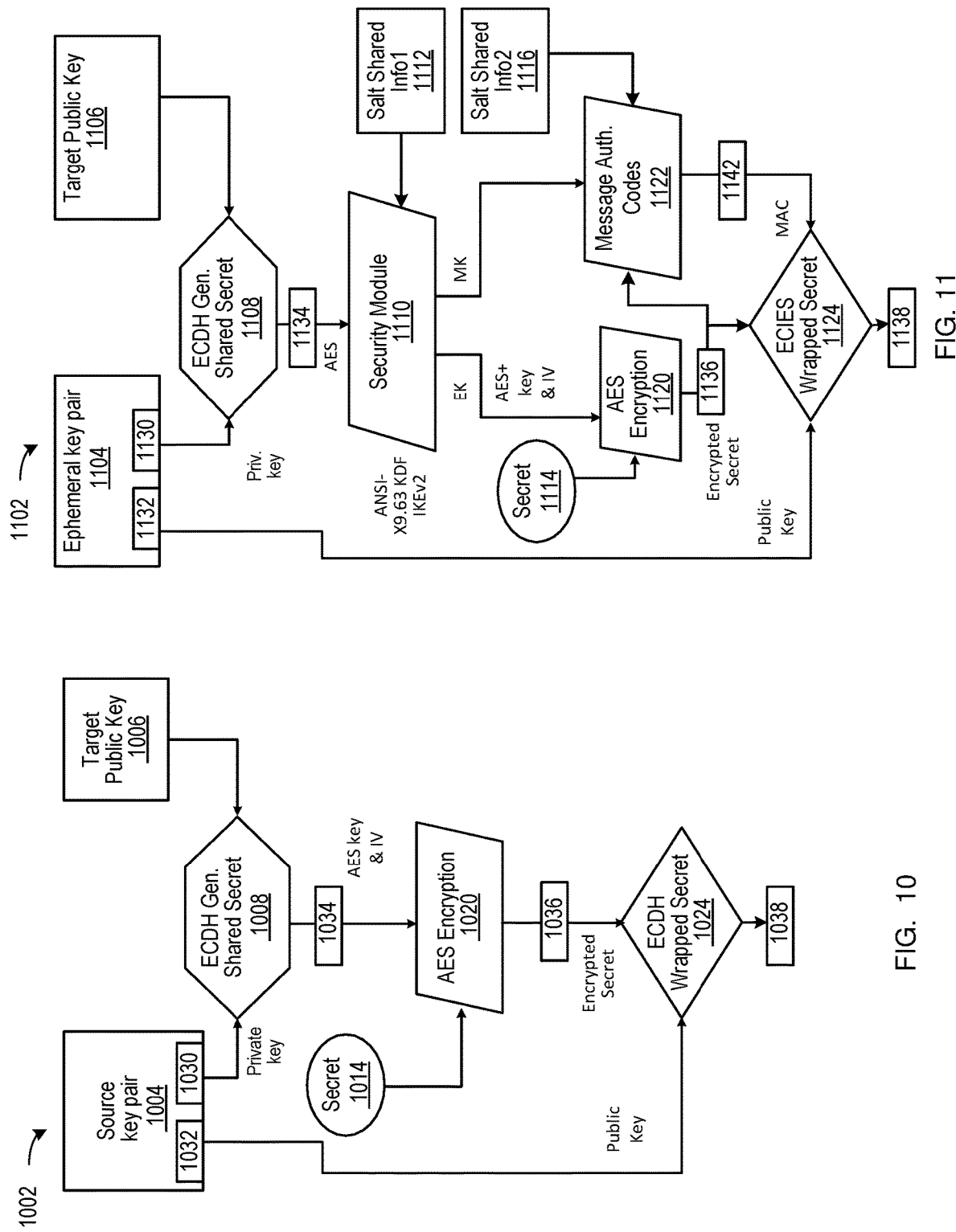
FIG. 10 depicts an example of an elliptic curve Diffie-Hellman security wrapping process of the secure programming system in an embodiment.
FIG. 11 depicts an example of an elliptic curve integrated encryption scheme security wrapping process of the secure programming system in an embodiment.

Referring now to FIG. 10, therein is shown an example of an elliptic curve Diffie-Hellman security wrapping process 1002 of the secure programming system 100 in an embodiment. The elliptic curve Diffie-Hellman (ECDH) technique can be used to encrypt content or secrets.

In an embodiment, a private key 1030 of a source key pair 1004 and a target public key 1006 can be used to generate an ECDH shared secret 1034 using a ECDH module 1008 using the ECDH technique. The ECDH module 1008 can be a combination of hardware and software. In some embodiments, the ECDH module 1008 can include an HSM for higher cryptographic performance.

The AES encryption module 1020 can use the ECDH shared secret 1034, an AES key, and an initialization vector (IV) to encrypt a secret 1014 using the Advanced Encryption Standard (AES) to generate an encrypted secret 1036.

The wrapped secret module 1024 can receive the encrypted secret 1036 and the public key 1032 of the source key pair 1004 and generate an ECDH wrapped secret 1038. The wrapped secret 1038 is the encrypted secret content which can represent data assets and other files that need to be protected.

Referring now to FIG. 11, therein is shown an example of an elliptic curve integrated encryption scheme security wrapping process 1102 of the secure programming system 100 in an embodiment.

In an embodiment, a ECDH module 1108 can use a private key 1130 of an ephemeral key pair 1104 and a target public key 1106 to generate an ECDH shared secret 1134. The ECDH shared secret 1134 is a unique value known to the two owners of the two key pairs used to calculate the ECDH shared secret 1134.

In some embodiments, a security module 1110 can receive the ECDH shared secret 1134 and generate a variety of security and encryption values including ephemeral keypairs (EK) and message keys (MK). The security module can include many key derivation function, and many secure hash algorithms (SHA-n). The ephemeral EC key pair can be used for source creates one-way encryption, aka perfect forward encryption. This can be a framework for strangers to communicate.

The security module 1110 can also generate a variety of key derivations functions values and SHA hash values including values that conform to different standards and specifications such as ANSI-X9.63-KDF, IKEv2-KDF, TLS-DKF, NIST-800-56-Con-KDF, SHA-1, SHA-224, SHA-256, SHA-384, SHA-512, or other similar values. For example, the ANSI-X9.63 Key Derivation Function is a standard designed to provide financial services industry security and encryption needs.

The security module 1110 can pass various values to an AES encryption module 1120. The values can include an ephemeral key, an AES+key, an initialization vector (IV). The security module 1110 can pass various values to a message authentication code module 1122, including a message key. The various values can be numeric, alphanumeric, symbolic, or other similar value types. In some embodiments, the security module 1110 can receive a salt value, such as a sale shared info1 1112 to help increase the level of security and randomness levels.

The AES encryption module 1120 can receive a secret 1114 content and generate an encrypted secret 1136 using the ephemeral key, the AES+ key, and the initialization vector. The encrypted secret 1136 can be passed to a wrapped secret module 1124, such as an ECIES wrapped secret module, along with the message authorization code 1142 from the message authentication code module 1122.

The message authentication code module 1122 can generate a message authentication code 1142 (MAC 1142) and pass it to the wrapped secret module 1124. The message authentication code module 1122 can also receive a salt value, such as a salt shared info2 1116 value. The salt value can increase the level of security and randomness levels.

The wrapped secret module 1124 can receive the encrypted secret 1136, a public key 1132 of the ephemeral key pair 1104, and the message authorization code 1142 and generate the wrapped secret 1138. The wrapped secret 1138 is a protected version of the secret 1114 that has been encrypted and authenticated with the MAC 1142 to allow for protection and verification of the secret 1138. The wrapped secret 1138 is the encrypted secret content 1114 which can represent data assets and other files that need to be protected and provisioned into the programmable devices.

Figure 12:
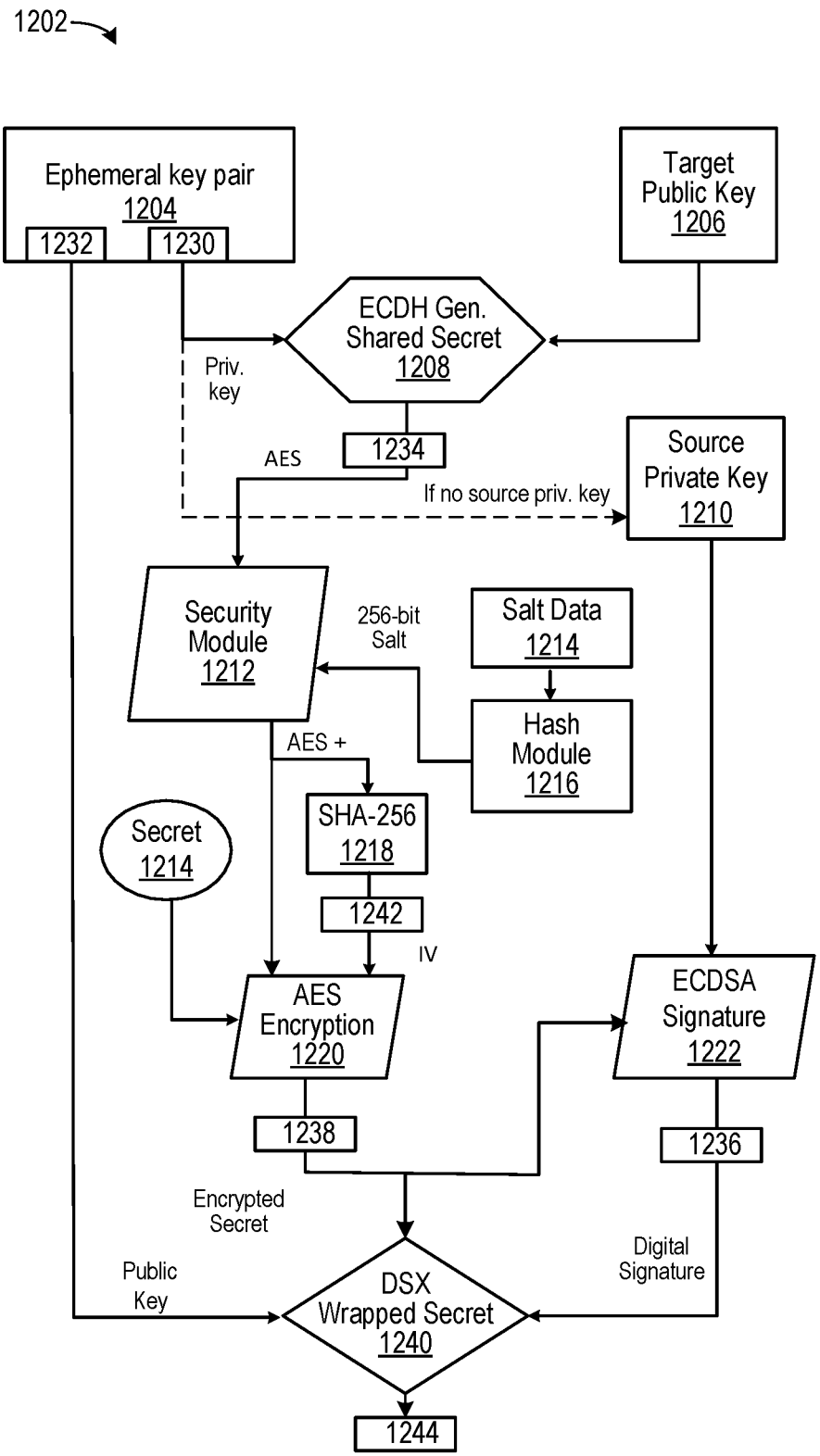
FIG. 12 depicts an example of a multi-stage security wrapping process of the secure programming system in an embodiment.

Referring now to FIG. 12, therein is shown an example of a security wrapping process 1202 of the secure programming system 100 in an embodiment.

An ECDH generate shared secret module 1108 can receive a private key 1130 of an ephemeral key pair 1104 and a target public key 1106 and generate an ECDH shared secret 1234. The ECDH shared secret 1234 is a unique value known to the two owners of the two key pairs used to calculate the ECDH shared secret 1134.

The ECDH shared secret 1208 can be passed to a security module 1212. The security module 1212 can provide cryptographic services, such as those compliant with ANSI-X9.63 key derivation function (KDF) and SHA-256. The security module 1212 can also receive a salt value, such as a 256-bit salt value, which is generated by a hash module 1216, such as a SHA-256 or other secure hash module, that initially receives a salt data value 1214.

An AES encryption module 1220 can receive one or more values directly and indirectly from the security module 1212. The security module 1212 can generate an AES+ value that can be passed directly to the AES encryption module 1220. In some embodiments, the AES+ value can also be passed to a second hash module 1218 to calculate a hash value of the AES+, such as a SHA-256 value. and then pass it to the AES encryption module 1220.

The AES encryption module 1220 can receive a secret 1214, such as content to be protected. The AES encryption module 1220 can encrypt the secret 1214 using the AES+ value and the initialization value 1242 and generate the encrypted secret 1238.

A signature module 1222, such as an elliptic curve digital signature algorithm ECDSA signature module, can receive the encrypted secret 1238 and a source private key 1210. In some embodiments if no source private key 1210 is available, the private key 1230 from the ephemeral key pair 1204 can be used. The signature module 1222 can generate a digital signature 1236 that can be passed to a wrapped secret module 1240.

The wrapped secret module 1240 can receive the encrypted secret 1238, a public key 1232 of the ephemeral key pair 1204, and the digital signature 1236 and generate the wrapped secret 1244. The wrapped secret 1244 is a protected version of the secret 1214 that has been encrypted and the signed with the digital signature 1236 to allow for protection and verification of the secret 1244.

In another embodiment, the key distribution function can receive a sale value from field data and calculate a SHA-256 hash to be used as 256-bit salt value for the key distribution function. This can result in an AES+ value to use as input for an AES function module. The AES function module can generate a DSX wrapped secret using the AES encrypted secret, the public key of the ephemeral key pair, and a digital signature generated by an ECDSA module using a source private key. The multi-stage security wrapping process can use a variety of informational tags and data. An example of the tags and data can be found in Table 2. The multi-stage wrapped secret is the encrypted secret content which can represent data assets and other files that need to be protected.

Although specific security techniques are described, it is understood that other security techniques can be used as the security threat profile changes over time. The security techniques are selected to provide the level of security required by the user and system.

Referring now to FIG. 13, therein is shown an example of a security interop layer of the secure programming system 1300 in an embodiment. The secure programming system 1300 can include the device programmer 1302 coupled to a host system 1304 via a remote procedure call layer 1312 (RPC layer 1312).

In an embodiment, the device programmer 1302 can include a security interop layer 1306 and a set of local dictionaries 1308 that can operate together to make functional calls to the host system 1304. The device programmer 1302 can be a system for controlling and managing the host system 1304 of the programming system 1300. In other embodiments, the host system 1304 can be part of the programming unit 110.

The device programmer 1302 can communicate with the host system 1304 via the RPC layer 1312. The host system 1304 can include a base security API 1322 and a hardware security module 1324 (HSM 1324). The HSM 1324 can be a dedicated hardware device configured to be enhanced for cryptographic operations.

The security interop layer 1306 is a set of code and definitions to allow the interoperation between different programming environments and frameworks, such as unmanaged ANSI C and NET. Interoperation relates to the ability of systems to work together with other systems. The security interop layer 1306 can be configured to interoperate with a security library of the host system 1304.

The base security API 1322 is a security and cryptographic library that can execute on the systems of the host system 1304, such as a library based on the PKCS #11 Interop library.

In an embodiment, instead of transferring the actual definitions across the host RPC connection, the device programmer 1302 can use the algorithms 1310 to create static template and mechanism definitions and store them in the local dictionaries 1308 of the device programmer 1302. The device programmer 1302 can retain and maintain copies of the local dictionaries 1308 when a programming job 1314, such as a SentriX security provisioning platform job, is loaded so the local dictionaries 1308 can be accessed during job execution time. The security provisioning platform can embed hardware-based root-of-trust and prevent unauthorized firmware from executing on a device.

The algorithm 1310 can simply provide element keys 1316 or names 1318 identifying the desired one of the dictionary entries 1320 when making a security API call to the host system 1304. This configuration can reduce system complexity and enables easy upgradability. For example, to get access to new definitions for an upgrade to one of the security libraries, such as the PKCS #11 Interop library on the host and in the algorithms and the system should operate correctly without any modifications to the components in the middle layers.

In other embodiments, the base security API 1322, such as a secure provisioning HSM API, can be based on the Cryptoki API (PKCS #11 standard) and can use a combination of native PKCS #11 definitions, provided by the PKCS #11 Interop library, and locally defined API calls. Algorithms, such as security algorithms, get access to the HSM functionality through a custom Host RPC interface, such as the RPC layer 1312. This access can be configured such that the use of the PKCS #11 Interop library provides both the ultimate flexibility and ease of development to the algorithms. The HSM 1324 can be included in the host system 1304.

In an embodiment, the base security API, such as the Cryptoki API, is not configured to support device provisioning in production environments. However, the interop layer can be configured to allow this functionality.

Much of the API's complexity is contained in the template and mechanism definitions, which can be used to define the data objects being used, templates, and the cryptographic operation to be performed, mechanisms.

In some embodiments, the security interop layer 1306 can operate between the device programmer 1302 and the hardware security module 1324. On the host system, the PKCS #11 Interop library can be used as a wrapper for the HSM calls and makes it easy to make these calls from NET code. The majority of the Cryptoki API calls are exposed to the algorithms through custom RPC calls. An algorithm can make a security RPC call, which will map directly to a Cryptoki API call. However, the issue remains of how to handle the parameters to each call, particularly the complex ones, such as the template and mechanism definitions.

In some other embodiments, rather than creating custom definitions and translation logic for the template and mechanism definitions, the system was configured to use the PKCS #11 Interop definitions directly. So, instead of the algorithms 1310 having to provide custom definitions, which would have required the conversion to PKCS #11 Interop definitions on the device programmer 1302, the system can be configured to use the security interop layer 1306 to use the PKCS #11 Interop definitions directly and pass them in the RPC calls through the RPC layer 1312.

Instead of these definitions for the security library calls, the security interop layer 1306 can be used to send them across the RPC layer 1312 with each call that requires them but use local definitions pre-configured in the host system 1304. will already be available on the host and the algorithms just need to reference them by an algorithm defined ID or name. So, the security provisioning algorithms were designed to include PKCS #11 Interop library for the help create the PKCS #11 definitions to be used seamlessly by the base security API 1322.

Thus, instead of transferring the actual definitions across the host RPC connection, the algorithms use static template and mechanism definitions and store them in a couple of dictionaries, the template dictionary and the mechanism dictionary. The device programmer 1302 side retains copies of these dictionaries when a secure provisioning job is loaded so they can be accessed during job execution time. Then the algorithm just needs to provide element keys or names identifying the desired dictionary entry when making a security system API call. This setup greatly reduces system complexity and enables easy upgradability. For example, the PKCS #11 Interop library can be updated on the host and in the security algorithms and everything will work without any modifications to the components in the middle.

Using the pre-defined dictionaries for templates and mechanisms can simplify the development of the security algorithms. This can also enable leveraging an existing library of definitions, instead of having to create new ones each time. Since template and mechanism creation is the most complex part of the API, this can reduce development time, especially as the collection of existing definitions grows over time. New security algorithms just need to pick the required definitions and add them to the dictionaries.

Referring now to FIG. 14, therein is shown an example of a secure programming system 1400 in an embodiment. The secure programming system 1400 can be used to provision content into the programmable devices. A user 1404 can use the secure programing system 1400 to provision devices including accessing cryptographic features in a hardware security module 1410.

The secure programming system 1404 can include a security access layer 1406, such as an unmanaged PKCS #11 library to interact with a cryptographic application programming interface 1408 (cryptographic API 1408) associated with the hardware security module 1410. The HSM 1410 can provide support for cryptographic operations including encryption, decryption, key generation, random number generation, or other similar operations. In some embodiments, the hardware security module 1410 can be located in a host system separate from the device programmer.

In an embodiment, the security access layer 1406 and the cryptographic API 1408 can implement and provide access to the PKCS #11 library cryptographic functionality as performed on the HSM 1410. The security access layer 1406, such as the unmanaged PKCS #11 library, can access the standard PKCS #11 API, also known as the Cryptoki API or the cryptographic token interface. The security algorithms can access the PKCS #11 functionality using the security access layer 1406. This can simplify the access to the cryptographic features including accessing the HSM 1410 on different system than the device programmer.

The Cryptoki API standard provides functionality for security messages, cryptographic functions, key and session management, and data exchange. In some other embodiments, the PKCS #11 standard and other security and cryptographic techniques can be implemented. A PKCS #11 token is a hardware and software interface to a secure database storing digital certificates, key, and other security information.

PKCS #11 is a cryptographic token interface API which can address cryptographic devices and data as tokens and perform cryptographic functions as implemented by the tokens. To implement security in an automated device production setting for secure provisioning programmable devices, the secure programming system 1400 must allow for secure transactions with the device programmer, the programming unit, and the programmable devices.

Figure 15:
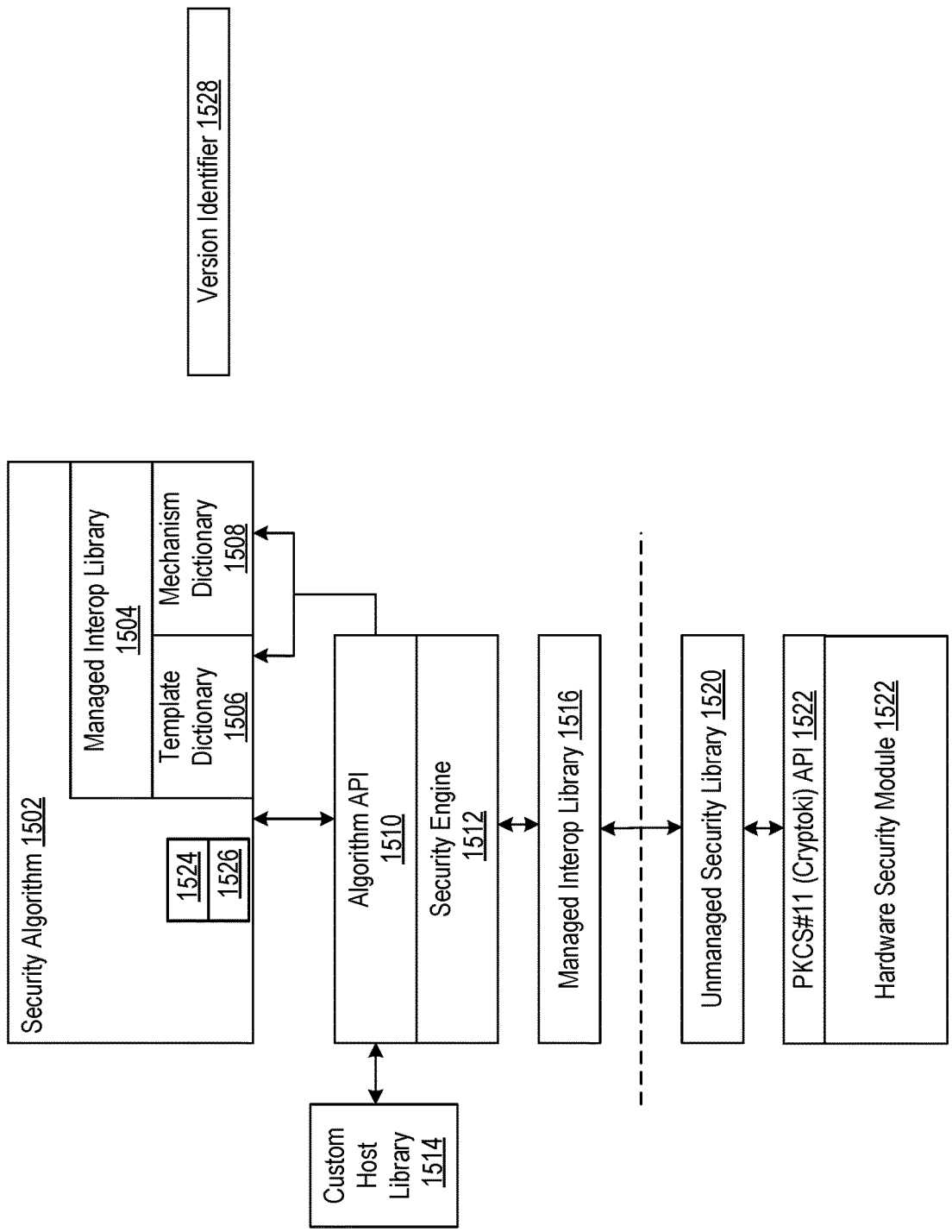
FIG. 15 depicts an example of an interaction diagram of the secure programming system in an embodiment.

Referring now to FIG. 15, therein is shown an example of a module view of a secure programming system 1500 in an embodiment. The module view focuses on the security algorithms, the HSM interface and other components. This is a static view of the modules involved in the secure programming system 1500.

In an embodiment, the secure programming system 1500 can include a security algorithm 1502, an algorithm API 1510, a custom host library 1514, a security engine 1512, and a managed interop library 1516 coupled to the hardware security module 1522 via an unmanaged security library 1520 and the cryptographic API 1522. For example, the unmanaged security library can be a PKCS #11 library and the cryptographic API 1522. This diagram shows a simple static module view of the secure programming system.

The security algorithm 1502 can be coupled to the managed interop library 1504. The managed interop library 1504 can be implemented in a variety of ways to support different programming environments. For example, the managed interop library 1504 can be configured to support the C# language, or other languages and computer environments. The managed interop library 1504 can support a variety of templates 1524 and mechanisms 1526 using a template dictionary 1506 and a mechanism dictionary 1508.

The inclusion of the managed interop library 1504 with the security algorithm 1502 and the creation of the template dictionary 1506 and the mechanism dictionary 1508 provide improved security by providing an abstracted access to the hardware security module functionality from the security algorithm 1502. This can provide a simplified way to access the cryptographic functionality of different implementations of the hardware security module 1522, such as devices from different vendors, different versions of the HSM, or other variations. This enables the performance, flexibility and capability objectives that were needed.

In another embodiment, the template dictionary 1506 and the mechanism dictionary 1508 can include a version identifier 1528 to verify consistency and compatibility with the security API of the HSM 1522. The version identifier 1528 can be a data element that can be provided and compared to a similar identifier in the HSM 1522. This can verify that both sides are at the correct level for proper interoperability.

The host system and the device programmer can retrieve and compare the version identifiers 1528 for each of the dictionaries to make sure the version on both systems are consistent. When the template dictionary 1506 and the mechanism dictionary 1508 are generated and deployed, the version identifiers 1528 can be included with the dictionaries and be accessible to verify the versions are consistent. For example, the security algorithm 1502 can access the version identifiers 1528 of the dictionaries on the host system and compare them with the version identifiers 1528 on the device programmer of the programming unit before making an abbreviated remote call to access functionality on the host system. If the version identifier 1528 do not match, then a version error flag can indicate a version mismatch condition and stop or suspend the provisioning process.

In some embodiments, a managed library can include managed code that is run in a controlled environment that can provide security and other services. Managed code can be more secure during execution because the controlled environment, such as the common language runtime (CLR) in the NET framework, can provide functionality such as memory allocation, object disposal, object creation, reference and type checking, garbage collection, and other operational services. For example, the controlled environment can also help prevent buffer overflows by providing additional checking of memory buffers.

In other embodiments, an unmanaged library can include unmanaged code that runs directly on the operating system. Such code can often be considered unsafe and can be susceptible to problems like memory leaks, buffer overflows, and other similar vulnerabilities. In some situations, unmanaged code does not have access to services such as garbage collection or memory management which can lead to memory leaks or other similar problems.

Figure 16:
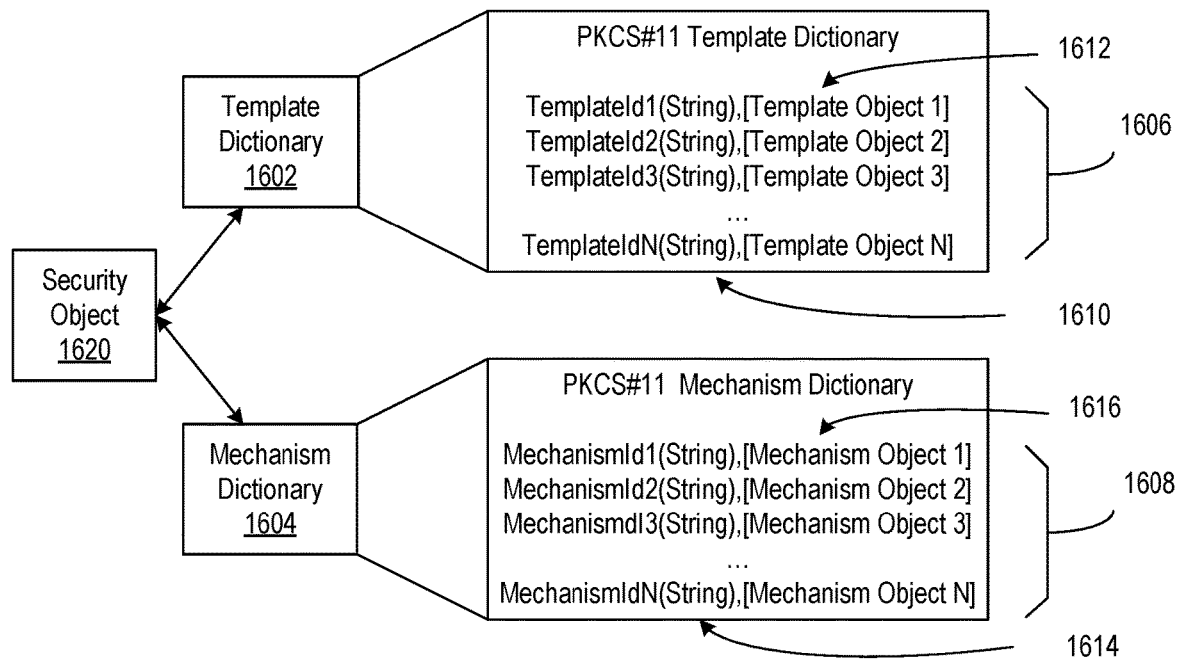
FIG. 16 depicts an example of template and mechanism dictionaries in an embodiment of the secure programming system.

Referring now to FIG. 16, therein is shown an example of a template dictionary 1602 and a mechanism dictionary 1604 in an embodiment of the secure programming system. The template dictionary 1602 and the mechanism dictionary 1604 can be entities that can be used to lookup information including data types, formats, structure information, security techniques, security functions, and other security information related to a security object 1620.

In some embodiments, the security object 1620 can be a data structure that can define a security data object. It can be associated with security access control functions and access rights that can limit access to the security object 1620. The access rights can also include user rights to access the security object 1620, rights to access the programmable devices 128, and access right to the device programmer. The access rights can include access control list structures (ACL) to grant common access rights to groups of users or devices. In other embodiments, the template dictionary 1602 and the mechanism dictionary 1604 can be data object that are securely accessed and stored. In some configurations, this can include being stored in secure storage areas and executed in a secure execution unit.

In an embodiment, the template dictionary 1602 and mechanism dictionary 1604 describe, and support the functionality the PKCS #11/Cryptoki API template and mechanism definitions. The dictionaries are collections of key/value pair entries with an identifier and a data object. The keys are unique strings identifying each entry. The values are either template or mechanism definitions. In some embodiments, the definitions can correspond to the Cryptoki API equivalents.

The template dictionary 1602 can include one or more templates 1606, such as template entries, where each of the templates 1606 can be defined with a template identifier 1610 and a template object 1612. The template identifier 1610 is a unique identification value for each of the templates 1606. The template object 1612 is a descriptor of the parameters needed to use the template 1606. The template object 1612 is a complex data structure describing the various properties and attributes of the security object 1620. The templates 1606 can be used to instantiate data objects with the characteristics of the templates 1606 as defined by the template object 1612. The templates 1606 can be used to instantiate data objects such as strings, numbers, security keys, content, digital signature, and other similar data types.

The template object 1612 can be expressed several ways. The template object 1612 can be a string value encoding the description of each of the individual data template components. The template object 1612 can encode a numerical or binary value representing a set of data values and types.

In some embodiments, the actual data values for an instance of the data structures represented in one of the template objects 1612 can be defined in a live data object that can accompany the template identifier 1610 and the template object 1612. In yet other embodiments, the actual data values can be references to existing data items already stored in the HSM or other locations on the host system. In an illustrative example, the template object 1612 or the live data object can refer to a private key of a key pair created and stored within the HSM or a secure storage unit on the host. The pre-existing data can be used to populate data fields within the template object when the template is reconstructed locally.

The mechanism dictionary 1604 can include one or more mechanisms 1608, such as mechanism entries, where each of the mechanisms 1608 can be defined with a mechanism identifier 1614 and a mechanism object 1616. The mechanism identifier 1614 is a unique identification value for each of the mechanisms 1608. The mechanism object 1616 is a complex data structure that describes the information and properties needed to use the security protocol or algorithm of the mechanism 1616. The mechanisms 1608 can be used to define local calls to the security library, such as the PKCS #11 library. The template objects 1612 and the mechanism objects 1616 can be defined by the security library. For example, they can be defined based on the PKCS #11 definitions in the PKCS11 interop library.

In some embodiments, the live data object can also include state information to be used to configure the mechanism object 1616. Such state information can include related objects, session information, timing information, security and access list information, or other similar state information.

In some other embodiments, the security algorithm 1502 can have full control of these definitions, since this ultimately controls what gets used or created (templates) and how it gets used or created (mechanisms). The security algorithms 1502 can have the ability to control these definitions to provide access to the features of the HSM. However, since the security algorithm 1502 resides on an embedded system, such as the device programmer or programming unit, maintaining all these complex definitions in the individual security algorithms 1502 can make management and version control difficult over time with changes to configurations, version, and data definitions. In some configurations, the call arguments get sent across a connection during a procedure call, such definitions would have to be marshalled, translated, and interpreted with the use of additional software elements. This can reduce performance and modifiability.

To improve overall performance and manageability, the remote procedure call definitions can be complex data structures describing either templates, which describe various properties of a security object 1620 or mechanisms which can describe the properties of some security protocols or algorithms. In this way, much of the complexity of the security API, such as PKCS #11 API, can be encoded in these definitions and accessed using the dictionaries.

In other configurations, the template dictionary 1602 and the mechanism dictionary 1604 can synchronized with one or more of the security API that are coupled to the HSM to provide access to the functionality in the security API and the HSM. The dictionaries can be deployed to the host system to provide access to the security API and HSM on the device programmer of the programming unit. This can be done automatically on a scheduled basis or on demand as needed. This provides the ability to invoke security features on the device programmer and programming unit by passing the template identifier 1610 and mechanism identifier 1614 and the appropriate data objects without direct access to the data and algorithm configurations on the other side of the RPC layer.

Figure 17:
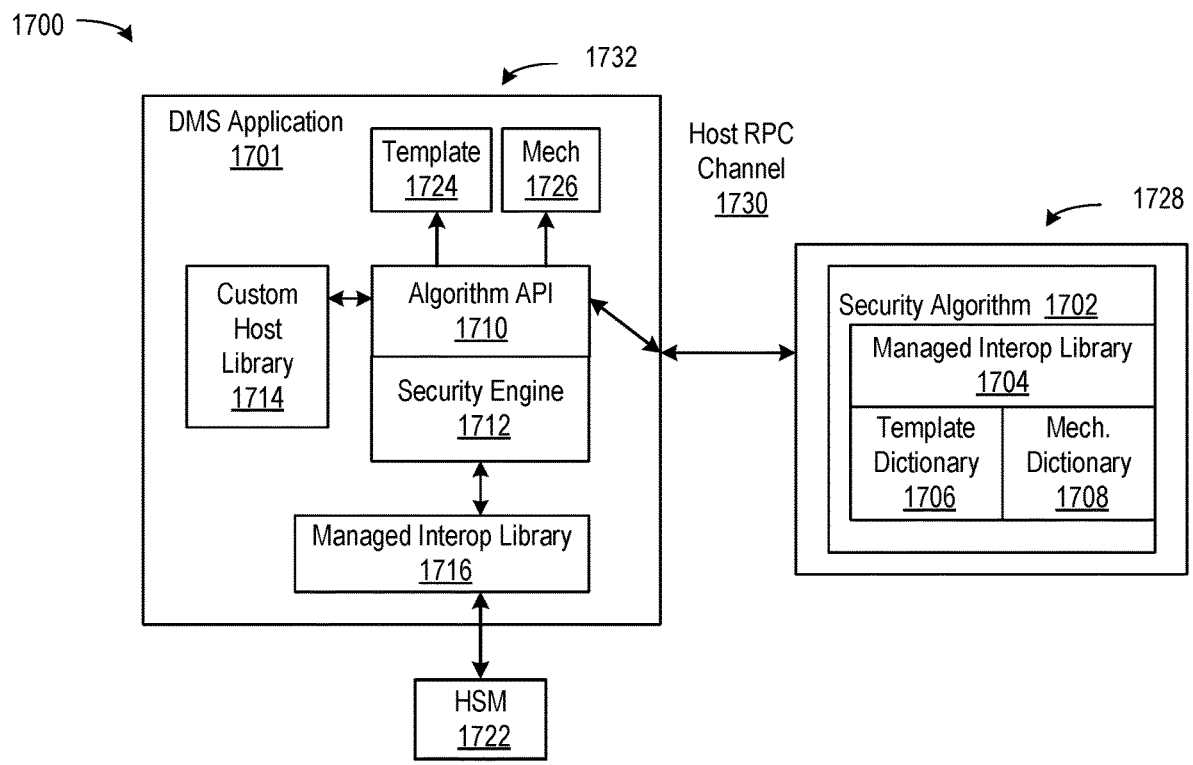
FIG. 17 depicts an example of a run time view of a secure programming system in an embodiment.

Referring now to FIG. 17, therein is shown an example of an embodiment of a run time view of a secure programming system 1700. This can show the state of the system during run-time operations on a host system 1732 linked to the device programmer 1728 via the host RPC channel 1730.

In some embodiments, the secure programming system 1700 can include the host system 1732 having a security algorithm 1702, a managed interop library 1704, a template dictionary 1706, and a mechanism dictionary 1708. The elements of the secure programming system 1700 are similar to those with similar names in other embodiments of the secure programming system.

The secure programming system 1700 can also include a data management software (DMS) application 1701 configured with a template 1724, a mechanism 1726, a custom host library 1714, an algorithm API 1710, a security engine 1712, a managed interop library 1716, and an HSM 1722.

In an embodiment, the security algorithm can be run on the device programmer 1728 and can include the data management software (DMS) application 1701 that can communicate with the rest of the secure programming system 1700 over a host RPC channel 1730. In some embodiments, the host RPC interface can be operated with the windows communication foundation (WCF). The WCF can support service-oriented applications.

Interfaces such as the WCF interface can support primitive types, such as strings, integers, and byte arrays. Complex data structures and mechanisms, such as the PKCS #11/Cryptoki API definitions and functions are more difficult. They require marshaling, serialization/de-serialization, and conversion between what the security algorithms can define and what the HSM 1722 actually expects in its supplied and unmanaged C-level PKCS #11 access library.

One alternative is to determine which data definitions the security algorithm 1702 can have access when making the calls to the HSM 1722. The HSM calls of the HSM API can be exposed through an algorithm API 1710 that provides remote procedure calls for each of the supported functions, such as the Cryptoki API functions. However, the parameters for each of the API calls need to be defined and maintained.

Next, the definitions of the templates and mechanisms needs to be coordinated with the current version of the HSM cryptographic API. Because the version can change over time, the confirmation of the current version is important.

In some embodiments, the interop library, such as a PKCS #11 interop library, can be incorporated into the security algorithm. The library can be used as a direct wrapper for cryptographic and security calls from C# down to the unmanaged C library associated with the hardware security module. However, the security algorithm cannot make such calls since it is running on the device programmer and can only make remote procedure calls over the Host RPC channel 1730.

However, the managed interop library 1704 can provide all of the relevant C#-level definitions that enable the PKCS #11 calls to be made. Thus, the managed interop library 1704 can be included in the security algorithm 1702 to provide the data and functional definitions for creating the templates and the mechanisms. The definitions can then be used directly by the RPC/security engine when making the calls to the HSM 1722. However, it is important to maintain version consistency with different versions of each of the components of the secure programming system to make sure the definitions can be used properly across the networked host RPC channel 1730.

In other embodiments, the establishment of the template dictionary 1706 and the mechanism dictionary 1708 can provide access to the template and mechanism definitions that are needed for proper operation. During operation, the data management system 1701 can instantiate a copy of the security algorithm 1702 during job initialization. This provides access to all of the statically defined elements, such as static definitions for all of the templates and mechanisms needed to support a particular use case. Thus, the data management system 1701 can then retain these static definitions and use them during job execution.

The security engine 1712 can then simply keep the dictionary definitions in its active memory during job setup. When making HSM calls, the security algorithm can send the desired one of the template identifier 1610 or the mechanism identifier 1614 across the remote procedure call channel 1730 and the data management system 1701 can retrieve the corresponding definition directly from the dictionary. The only thing that transfers across the RPC connection is the identifier strings and the security algorithm 1702 still has full control of how these definitions get created and used.

Having the template dictionary 1706 and the mechanism dictionary 1708 helps increase the level of simplicity for the secure programming system 1700. The template and mechanism definitions can be created in a separate library module that can be accessible to the secure programming system 1700. by all the secure provision system supports. For example, a template that describes an AES256 secret key just needs to be created once and can be reused as needed. After that the security algorithm 1702 can place the new definition into the template dictionary 1706 without ever having to worry about how to actually create one. So, each particular template or mechanism definition only really needs to be created once and then it can become an easily reusable element.

Referring now to FIG. 18A, therein is shown an example of a first portion of Table 1 showing PKCS #11 functions in an embodiment. The first portion of Table 1 shows general purpose function, slot and token management functions, session management functions, object management function, and encryption functions. These functions can be defined as mechanisms in the mechanism dictionary 1604.

Referring now to FIG. 18B, therein is shown an example of a second portion of Table 1 showing PKCS #11 functions in an embodiment. The second portion of Table 1 shows decryption functions, message digesting functions, signing and MAC authentication functions, functions for verifying signatures and message authentication codes (MAC), dual-purpose cryptographic functions, key management function, random number functions, and parallel function management functions. These functions can be defined as mechanisms in the mechanism dictionary 1604.

Referring now to FIG. 19 therein is shown an example of Table 2 showing exemplary security data types. The data types can be used to define different data objects for security purposes.

Figure 20:
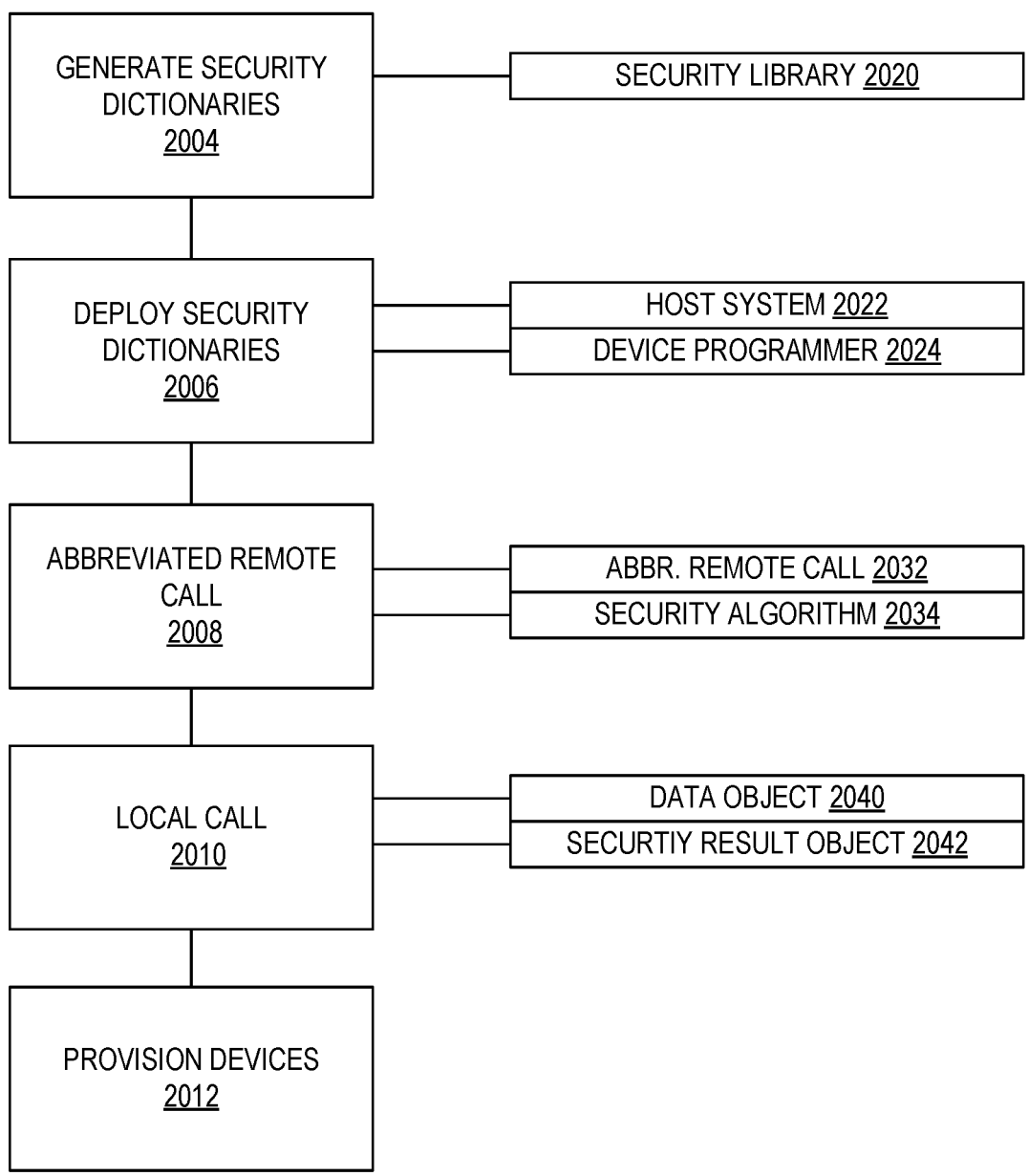
FIG. 20 depicts an example of the secure programming system process flow.

Referring now to FIG. 20, therein is shown an example of a secure programming system process flow 2002 for the programmable devices 128 in accordance with one or more embodiments. The various elements of the secure programming system process flow 2002 may be performed in a variety of systems and configurations including systems such as the system 500 described above.

In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

The secure programming system process flow 2002 can operate in a variety of ways. In one embodiment, the secure programming system process flow 2002 can generate the template and mechanism dictionaries, deploy the dictionaries to the programming unit and the host system, initiate remote call to programming unit using identifiers, initiate local security action using remote call identifiers, and provision programmable devices.

The secure programming system process flow 2002 can have a variety of configurations. For example, the secure programming system process flow 2002 can include a generate dictionaries step, a deploy dictionaries step, a remote call step, a local call step, and a provision step. The control flow of the secure programming system process flow 2002 can pass from step to step in sequential order.

The generate dictionaries step 2004 can initialize the template dictionary 1602 and the mechanism dictionary 1604 based on a security library 2020, such as a PKCS #11 library. Each of the function calls can be mapped to an entry in the mechanism dictionary 1604 having the mechanism identifier 1614 and the mechanism object 1616. Each of the data objects used in the security library 2020 can be mapped to an entry in the template dictionary 1602 having a template identifier 1610 and a template object 1612. One mechanism or template dictionary entity defines one entity. In an example, the template object can represent one key of some type and the mechanism object can represent on single security mechanism, such as RSA encryption or other encryption techniques.

In some embodiments, a mapping library can map each of the mechanisms to one or more of the templates. This can support the use of multiple sets of data object templates for each of the mechanisms. In some configurations, the mechanisms can be used to implement overloaded functions with different configurations of the data objects needed to perform the function. In an illustrative example, the mechanisms and templates are used to make API calls. If a system needs to create a key for the encryption operation, a CreateKey call can be made with the appropriate template identifier specified. Then this key can be used in another API call—encrypt call, for example, which would specify the encryption mechanism identifier.

The deploy dictionaries step 2006 can move copies of the template dictionary 1602 and the mechanism dictionary 1604 to the programming unit 110 and the host system 1302. The programming unit 110 can include the programmer 2024 configured to provision the programmable devices 128. The programming unit 110 and the host system 1302 can be physically separate and the versions of the dictionaries can be synchronized manually or automatically to insure proper compatibility. The dictionary definitions are static but can be changed over time with new development or new versions of the security libraries.

The abbreviated remote call step 2008 can initiate an abbreviated remote call 2032 from a security algorithm 2034 running on the programming unit 110 to initiate security functions on the host system 2022 using one or more of the template identifiers 1610 and the mechanism identifiers 1614. The abbreviated remote call 2032 can be a function call using an abbreviated format that can include the mechanism identifier 1614 and one or more of the template identifiers 1610. This can reduce the amount of data and the calling complexity needed to access the security library 2020 on the host system 2022. In some embodiments, the two identifiers can be string values. The template identifiers 1610 can identify entries in the template dictionary 1602 that can represent data objects 2036 that can be parameters of the mechanisms on the host system 2022.

The abbreviated remote call 2032 can be configured to identify one or more of the templates and the mechanisms in the dictionaries and initiate a remote network call to the host system 2022. In some embodiments, the device programmer 2024 can use a managed interop library 1704 to define the parameters of the abbreviated remote call 2032 and extract the definitions for the templates and mechanisms from the dictionaries. This can be performed by the security algorithm 2034. By making the abbreviated remote call 2032 using dictionary values of the template identifier 1610 and the mechanism identifier 1614 instead of the actual data structures can reduce the amount of data transferred over the host RPC channel 1730 and improve overall performance. Further, checking that the version identifiers 1528 of the host system and the device programmer are consistent can help reduce incompatibility issues.

Using the abbreviated remote call 2032 to access the dedicated hardware security module 1722 coupled to the host system 1732 can reduce complexity and increase security by eliminating the need for a second hardware security module on the device programmer 1728. Because the hardware security module 1722 can include secure storage of security object, such as keys, key pairs, digital messages, hash, and other security elements, reducing the number of such modules reduces the potential security leaks in the overall system. For example, by only using security items on the HSM 1722 of the host system 1732, there need to transfer high level security items, such as keys or hash values, over the host RPC channel 1730 can be reduced. This can reduce the potential for interception by third parties.

The local call step 2010 can receive the abbreviated remote call 2032 from the programming unit 2024, decode the abbreviated remote call 2032, map the template identifiers 1610 and the mechanism identifiers 1614 to local API calls on the host system 2022 and the HSM 1722, and execute the local API calls based on the identifiers and accompanying data.

In some embodiments, the host system 2022 can use the security engine 1712, the algorithm API 1710 and the custom host library 1714 to process the abbreviated remote call 2032. The algorithm API 1710 can support mapping the mechanism identifier 1614 in the local copy of the mechanism dictionary 1726 to identify the mechanism in the local security library by looking up the mechanism identifier 1614.

The host system 2022 can also use the template identifier 1610 passed in the abbreviated remote call 2032 to look up the definitions for the data objects corresponding to the template identifier 1610 and populate them based on information in the dictionaries. In some embodiments, a local library with reusable information can be provided to help populate the templates.

Once the mechanism object 1616 and the template object 1612 have been identified, they can be instantiated on the host system 2022 by the security engine 1712. The security engine 1712 can control the data management software (DMS) application 1701 and interact with the managed interop library 1716 to execute the local security calls that utilize the HSM 1722. This essentially allows the device programmer 1728 to access the HSM remotely without having a separate HSM directly in the device programmer 1728 or programming unit. Thus, the host system 2022 and the DMS application 1701 can manage the access to the HSM 1722 in a centralized fashion. For example, this can allow a plurality of the device programmers 1728 to use the host system 2022 with the HSM 1722.

The local call step 2010 can execute the security code in the managed interop library 1716 to generate a security result object 2042. The security result object 2042 a data object 2040 produced as a result of the execution of the local call. The security result object 2042 can have different configurations and values. The security result object 2042 can be a status, a result, or other data value. The security result object 2042 can be a security object such as a cryptographic key pair, an individual key, an encryption operation result, a verification operation result, or other data object 2040 generated by the security library function executed by the local call step 2010.

For example, the security result object 2042 can be a status value indicating that a key pair has been successfully created and stored in a secure storage area of the HSM 1722. In another example, the security result object 2042 can be a decrypted content file that can be transferred to the device programmer 2024 to be provisioned in to one or more of the programmable devices 128. In yet another example, the security result object 2042 can be a message authorization code or a digital signature that can be stored locally in secure storage or transferred to the device programmer 2024 for provisioning into the programmable devices 128.

The security result object 2042 can be transferred as one or more byte arrays. The RPC service support data of any size, so if a large content item is being returned by the RPC response, the device programmer of the programming unit will receive a byte array of the entire data.

The provision devices step 2010 can receive the security result object 2042 back at the device programmer 2024 and program the content into the programmable devices 128. The returned results can include security information, encrypted and decrypted content, authenticate values, and other similar content needed to program the target content of the programmable devices 128.

4.0. Example Embodiments

Examples of some embodiments are represented, without limitation, in the following clauses and use cases:

According to an embodiment, a method of operation of a secure programming system comprises generating a mechanism dictionary for a security library including mapping each function call of the security library to a mechanism identifier and a mechanism object definition of the function call, generating a template dictionary for a security library including mapping each data object of the security library to a template identifier and a template object definition of the data object, deploying the template dictionary and the mechanism dictionary to a host system having a hardware security module (HSM), the template dictionary and the mechanism dictionary linked to a host security library on the host system, deploying the template dictionary and the mechanism dictionary to a device programmer coupled to the host system over a network link, executing an abbreviated remote call from the device programmer to the host system with the mechanism identifier and one or more of the template identifiers for executing the corresponding mechanism function call of the host security library on the host system with host data objects corresponding to the template identifiers wherein the execution of the mechanism function call performs a security function of the host security library, mounting a programmable device in a device programmer of a programming unit, provisioning the programmable device on the device programmer based on a result of the abbreviated remote call.

In an embodiment, the method further comprises generating a security result object on the host system and returning the security result object to the device programmer in response to the abbreviated remote call.

In an embodiment, the method further comprises generating a security result object on the host system and the security result object is a cryptographic key pair.

In an embodiment, the method further comprises generating a security result object on the host system; the security result object is a cryptographic key securely stored within the HSM.

In an embodiment, the method further comprises generating a security result object on the host system; the security result object is a cryptographic key securely stored within the HSM.

In an embodiment, the method further comprises generating a security result object on the host system; the security result object is a decrypted data object.

In an embodiment, the method further comprises generating a security result object on the host system and the security result object is an encrypted data object, returning the security result object to the device programmer, and provisioning the programmable device with the security result object.

In an embodiment, the non-transitory computer-readable media further comprises generating a mechanism dictionary for a security library including mapping each function call of the security library to a mechanism identifier and a mechanism object definition of the function call, generating a template dictionary for a security library including mapping each data object of the security library to a template identifier and a template object definition of the data object, deploying the template dictionary and the mechanism dictionary to a host system having a hardware security module (HSM), the template dictionary and the mechanism dictionary linked to a host security library on the host system, deploying the template dictionary and the mechanism dictionary to a device programmer coupled to the host system over a network link, executing an abbreviated remote call from the device programmer to the host system with the mechanism identifier and one or more of the template identifiers for executing the corresponding mechanism function call of the host security library on the host system with host data objects corresponding to the template identifiers wherein the execution of the mechanism function call performs a security function of the host security library, mounting a programmable device in a device programmer of a programming unit, provisioning the programmable device on the device programmer based on a result of the abbreviated remote call.

In an embodiment, the non-transitory computer-readable media further comprises generating a security result object on the host system and returning the security result object to the device programmer in response to the abbreviated remote call.

In an embodiment, the non-transitory computer-readable media further comprises generating a security result object on the host system and the security result object is a cryptographic key pair.

In an embodiment, the non-transitory computer-readable media further comprises generating a security result object on the host system; the security result object is a cryptographic key securely stored within the HSM.

In an embodiment, the non-transitory computer-readable media further comprises generating a security result object on the host system; the security result object is a cryptographic key securely stored within the HSM.

In an embodiment, the non-transitory computer-readable media further comprises generating a security result object on the host system; the security result object is a decrypted data object.

In an embodiment, the non-transitory computer-readable media further comprises generating a security result object on the host system and the security result object is an encrypted data object, returning the security result object to the device programmer, and provisioning the programmable device with the security result object.

According to an embodiment, a security programming system comprises a programming unit having a security controller and a device programmer for mounting a programmable device, the security controller for generating a mechanism dictionary for a security library including mapping each function call of the security library to a mechanism identifier and a mechanism object definition of the function call, executing an abbreviated remote call from the device programmer to the host system with the mechanism identifier and one or more of the template identifiers for executing the corresponding mechanism function call of a host security library on the host system with host data objects corresponding to the template identifiers wherein the execution of the mechanism function call performs a security function of the host security library, and provisioning the programmable device on the device programmer based on a result of the abbreviated remote call, and a host system, coupled to the programming unit over a network link, for generating a template dictionary for a security library including mapping each data object of the security library to a template identifier and a template object definition of the data object, the template dictionary and the mechanism directory stored locally on the host system and both dictionaries linked to a host security library on the host system, and the template dictionary and the mechanism dictionary stored on the programming unit.

In an embodiment, the system further comprises the host system including a security result object that is returned to the device programmer in response to the abbreviated remote call.

In an embodiment, the system further comprises the host system including a security result object and the security result object is a cryptographic key pair.

In an embodiment, the system further comprises the host system including the security result object that is a cryptographic key securely stored within an HSM.

In an embodiment, the system further comprises an HSM coupled to the host system with a security result object that is a cryptographic key securely stored within an HSM.

In an embodiment, the system further comprises the host system including a security result object that is a decrypted data object.

Other examples of these and other embodiments are found throughout this disclosure.

5.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of operating a security programming system comprising:
   generating a mechanism dictionary for a security library including mapping each function call of the security library to a mechanism identifier and a mechanism object definition of the function call;
   generating a template dictionary for the security library including mapping each data object of the security library to a template identifier and a template object definition of the data object;

deploying the template dictionary and the mechanism dictionary to a host system having a hardware security module (HSM), the template dictionary and the mechanism dictionary linked to a host security library on the host system;

deploying the template dictionary and the mechanism dictionary to a device programmer coupled to the host system over a network link;

executing an abbreviated remote call from the device programmer to the host system with the mechanism identifier and one or more of the template identifiers for executing the corresponding mechanism function call of the host security library on the host system with host data objects corresponding to the template identifiers wherein the execution of the mechanism function call performs a security function of the host security library;

mounting a programmable device in the device programmer of a programming unit;

provisioning the programmable device on the device programmer based on a result of the abbreviated remote call.

2. The method as claimed in claim 1 wherein the executing the abbreviated remote call includes generating a security result object on the host system and returning the security result object to the device programmer in response to the abbreviated remote call.

3. The method as claimed in claim 1 wherein the executing the abbreviated remote call includes generating a security result object on the host system and the security result object is a cryptographic key pair.

4. The method as claimed in claim 1 wherein executing the abbreviated remote call includes generating a security result object on the host system; the security result object is a cryptographic key securely stored within the HSM.

5. The method as claimed in claim 1 wherein executing the abbreviated remote call includes generating a security result object on the host system; the security result object is a cryptographic key securely stored within the HSM.

6. The method as claimed in claim 1 wherein executing the abbreviated remote call includes generating a security result object on the host system; the security result object is a decrypted data object.

7. The method as claimed in claim 1 wherein executing the abbreviated remote call includes:
generating a security result object on the host system and the security result object is an encrypted data object;
returning the security result object to the device programmer; and
provisioning the programmable device with the security result object.

8. One or more non-transitory computer-readable media storing instructions that, when executed by one or more computing devices, cause:
generating a mechanism dictionary for a security library including mapping each function call of the security library to a mechanism identifier and a mechanism object definition of the function call;
generating a template dictionary for the security library including mapping each data object of the security library to a template identifier and a template object definition of the data object;
deploying the template dictionary and the mechanism dictionary to a host system having a hardware security module (HSM), the template dictionary and the mechanism dictionary linked to a host security library on the host system;

deploying the template dictionary and the mechanism dictionary to a device programmer coupled to the host system over a network link;

executing an abbreviated remote call from the device programmer to the host system with the mechanism identifier and one or more of the template identifiers for executing the corresponding mechanism function call of the host security library on the host system with host data objects corresponding to the template identifiers wherein the execution of the mechanism function call performs a security function of the host security library;

mounting a programmable device in the device programmer of a programming unit;

provisioning the programmable device on the device programmer based on a result of the abbreviated remote call.

9. The non-transitory computer-readable media of claim 8, wherein the instruction when executed by the one or more computing devices, further cause generating a security result object on the host system and returning the security result object to the device programmer in response to the abbreviated remote call.

10. The non-transitory computer-readable media of claim 8, wherein the instruction when executed by the one or more computing devices, further cause generating a security result object on the host system and the security result object is a cryptographic key pair.

11. The non-transitory computer-readable media of claim 8, wherein the instruction when executed by the one or more computing devices, further cause generating a security result object on the host system; the security result object is a cryptographic key securely stored within the HSM.

12. The non-transitory computer-readable media of claim 8, wherein the instruction when executed by the one or more computing devices, further cause generating a security result object on the host system; the security result object is a cryptographic key securely stored within the HSM.

13. The non-transitory computer-readable media of claim 8, wherein the instruction when executed by the one or more computing devices, further cause generating a security result object on the host system; the security result object is a decrypted data object.

14. The non-transitory computer-readable media of claim 8, wherein the instruction when executed by the one or more computing devices, further cause:
generating a security result object on the host system and the security result object is an encrypted data object;
returning the security result object to the device programmer; and
provisioning the programmable device with the security result object.

15. A security programming system comprising:
a programming unit having a security controller and a device programmer for mounting a programmable device, the security controller for generating a mechanism dictionary for a security library including mapping each function call of the security library to a mechanism identifier and a mechanism object definition of the function call; executing an abbreviated remote call from the device programmer to the host system with the mechanism identifier and one or more of the template identifiers for executing the corresponding mechanism function call of a host security library on the host system with host data objects corresponding to the template identifiers wherein the execution of the mechanism function call performs a security function of the host security library; and provisioning the programmable device on the device programmer based on a result of the abbreviated remote call; and a host system, coupled to the programming unit over a network link, for generating a template dictionary for the security library including mapping each data object of the security library to a template identifier and a template object definition of the data object, the template dictionary and the mechanism directory stored locally on the host system and both dictionaries linked to the host security library on the host system; the template dictionary and the mechanism dictionary stored on the programming unit; and the host system having a hardware security module (HSM).

16. The system as claimed in claim 15 wherein the host system includes a security result object that is returned to the device programmer in response to the abbreviated remote call.

17. The system as claimed in claim 15 wherein the host system includes a security result object and the security result object is a cryptographic key pair.

18. The system as claimed in claim 15 wherein the host system includes a security result object that is a cryptographic key securely stored within the HSM.

19. The system as claimed in claim 15 further comprising the HSM coupled to the host system with a security result object that is a cryptographic key securely stored within the HSM.

20. The system as claimed in claim 15 wherein the host system includes a security result object that is a decrypted data object.

* * * * *